US007054876B2

United States Patent
Yanase et al.

(10) Patent No.: US 7,054,876 B2
(45) Date of Patent: May 30, 2006

(54) PROGRAM, APPARATUS, AND METHOD OF CONDUCTING QUESTIONNAIRE

(75) Inventors: Takashi Yanase, Kawasaki (JP); Ryo Ochitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 10/326,298

(22) Filed: Dec. 23, 2002

(65) Prior Publication Data
US 2003/0233337 A1    Dec. 18, 2003

(30) Foreign Application Priority Data
Jun. 13, 2002    (JP)    ............................. 2002-173291

(51) Int. Cl.
*G06F 17/30*    (2006.01)
(52) U.S. Cl. ................. 707/101; 707/104.1; 725/9
(58) Field of Classification Search ............ 707/1, 707/101; 705/7, 10, 14; 725/9; 434/353
See application file for complete search history.

(56) References Cited

U.S. PATENT DOCUMENTS

| 6,539,392 B1 * | 3/2003 | Rebane ..................... 707/101 |
| 2001/0018178 A1 * | 8/2001 | Siefert ..................... 434/322 |
| 2002/0062248 A1 * | 5/2002 | Sakurai ..................... 705/14 |
| 2003/0083962 A1 * | 5/2003 | Araki et al. ............... 705/27 |

* cited by examiner

Primary Examiner—Jeffery Gaffin
Assistant Examiner—Hassan Mahmoudi
(74) Attorney, Agent, or Firm—Staas & Halsey LLP

(57) ABSTRACT

In a questionnaire conducting apparatus, a questionnaire conducting section presents a questionnaire to a respondent terminal of a questionnaire respondent on a Web screen via a network. A questionnaire response collector collects responses to the questionnaire for analysis, and a questionnaire corrector corrects the questionnaire based on a result of collecting and analyzing the responses to the questionnaire. The questionnaire conducting section conducts a questionnaire to the questionnaire respondent based on the corrected questionnaire.

37 Claims, 24 Drawing Sheets

FIG.2

| QUESTION ID | CORRECTED VERSION | TYPE | ITEM |
|---|---|---|---|
| QUESTION 1 | 1 | QUESTION TEXT | PLEASE ANSWER THE FOLLOWING QUESTION ABOUT THE XX SERVICE. HAVE YOU EVER USED THE XX SERVICE? |
| | | INITIAL CHOICE 1 | YES |
| | | INITIAL CHOICE 2 | NO |
| QUESTION 2 | 1 | QUESTION TEXT | WHAT KIND OF IMPRESSION DO YOU HAVE ABOUT THE XX SERVICE? |
| | | INITIAL CHOICE 1 | CONVENIENT |
| | | INITIAL CHOICE 2 | LOW PRICE |
| | | FREE DESCRIPTION | OTHERS |

FIG.3

| | 130 | |
|---|---|---|
| RESPONDENT MAIL ADDRESS : xxx@abc.com | | |
| RESPONDED QUESTIONS : VERSION 1 | | |
| QUESTION ID | SELECTED CHOICE | CONTENTS OF FREE DESCRIPTION |
| QUESTION 1 | INITIAL CHOICE 1 | |
| QUESTION 2 | FREE DESCRIPTION | IT IS A LITTLE DIFFICULT FOR ME TO UNDERSTAND THE MENU. |

FIG.4

| QUESTION ID | USEFUL RESPONSE | RESPONDENT MAIL ADDRESS | TYPE | NUMBER OF TIMES OF SELECTION |
|---|---|---|---|---|
| QUESTION 2 | IT IS A LITTLE DIFFICULT FOR ME TO UNDERSTAND THE MENU. | xxx@abc.com | ADDITIONAL CHOICE 1 | 0 |
| | | yyy@def.com | | |
| | | zzz@ghi.com | | |

| RESPONDENT MAIL ADDRESS | POINT |
|---|---|
| xxx@abc.com | 100 |
| yyy@def.com | 45 |
| zzz@ghi.com | 10 |
| abcde@xyz.ne.jp | 0 |
| ... | ... |

FIG.19

(QUESTION VER. 1)

QUESTION 1    PLEASE ANSWER THE FOLLOWING QUESTION ABOUT THE XX SERVICE.
HAVE YOU EVER USED THE XX SERVICE?

○ YES
     ○ NO

QUESTION 2    WHAT KIND OF IMPRESSION DO YOU HAVE ABOUT THE XX SERVICE?

○ CONVENIENT
     ○ LOW PRICE
     ○ OTHERS

RESPONDENT MAIL ADDRESS

FIG.20

(QUESTION VER. 1)

QUESTION 1    PLEASE ANSWER THE FOLLOWING QUESTION ABOUT THE XX SERVICE.
HAVE YOU EVER USED THE XX SERVICE?

● YES
     ○ NO

QUESTION 2    WHAT KIND OF IMPRESSION DO YOU HAVE ABOUT THE XX SERVICE?

○ CONVENIENT
     ○ LOW PRICE
     ● OTHERS

IT IS A LITTLE DIFFICULT FOR ME TO UNDERSTAND THE MENU.

RESPONDENT MAIL ADDRESS    xxx@abc.com

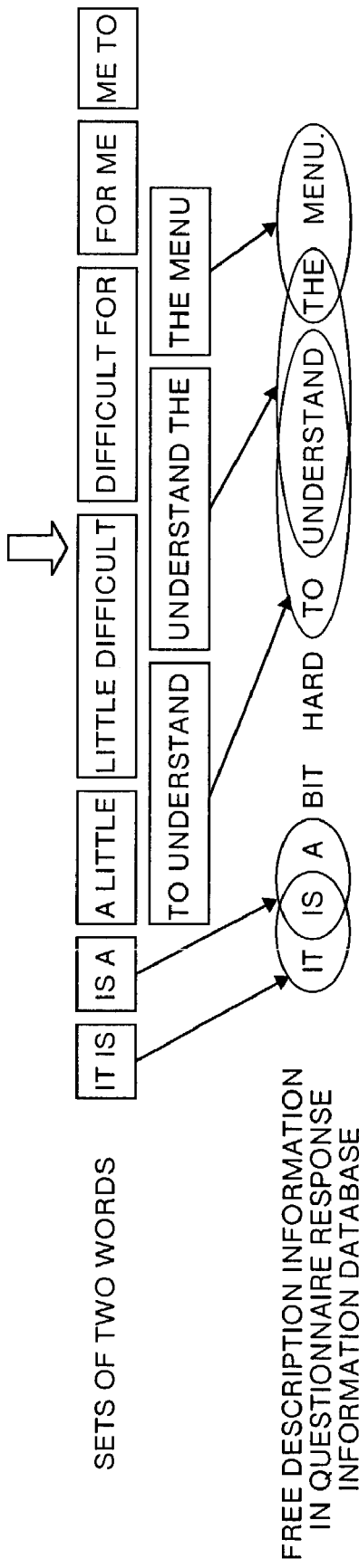

FIG.22

| QUESTION ID | CORRECTED VERSION | TYPE | ITEM |
|---|---|---|---|
| QUESTION 1 | 1 | QUESTION TEXT | PLEASE ANSWER THE FOLLOWING QUESTIONS ABOUT THE XX SERVICE. HAVE YOU EVER USED THE XX SERVICE? |
| | | INITIAL CHOICE 1 | YES |
| | | INITIAL CHOICE 2 | NO |
| QUESTION 2 | 2 | QUESTION TEXT | WHAT KIND OF IMPRESSION DO YOU HAVE ABOUT THE XX SERVICE? |
| | | INITIAL CHOICE 1 | CONVENIENT |
| | | INITIAL CHOICE 2 | LOW PRICE |
| | | ADDITIONAL CHOICE 1 | IT IS A LITTLE DIFFICULT FOR ME TO UNDERSTAND THE MENU. |
| | | FREE DESCRIPTION | OTHERS |

DEAR abcde@xyz.com
THANK YOU VERY MUCH FOR YOUR RESPONSE MADE TO OUR QUESTIONNAIRE LAST TIME.
AFTER YOUR LAST RESPONSE, WE HAVE INCREASED THE NUMBER OF CHOICES FOR RESPONSE BASED ON THE CONTENTS OF RESPONSES FROM OTHER CUSTOMERS. WILL YOU PLEASE MAKE ACCESS TO THE FOLLOWING URL AND RESPOND TO OUR REVISED QUESTIONNAIRE AGAIN. THANK YOU FOR YOUR COOPERATION.

URL:
http://www.xx-enquete.com/question.cgi?id=abcde@xyz.com

DEAR abcde@xyz.com

THANK YOU VERY MUCH FOR YOUR RESPONSE MADE TO OUR QUESTIONNAIRE LAST TIME.
AFTER YOUR LAST RESPONSE, WE HAVE INCREASED THE NUMBER OF CHOICES FOR RESPONSE BASED ON THE CONTENTS OF RESPONSES FROM OTHER CUSTOMERS. WILL YOU PLEASE RESPOND TO OUR REVISED QUESTIONNAIRE AGAIN. THANK YOU FOR YOUR COOPERATION.

QUESTION 2   WHAT KIND OF IMPRESSION DO YOU HAVE ABOUT THE XX SERVICE?

○ CONVENIENT

○ LOW PRICE

○ IT IS A LITTLE DIFFICULT FOR ME TO UNDERSTAND THE MENU.

○ OTHERS

(QUESTION VER. 2)
QUESTION 1    PLEASE ANSWER THE FOLLOWING QUESTION ABOUT THE XX SERVICE.
HAVE YOU EVER USED THE XX SERVICE?
- ○ YES
- ○ NO

QUESTION 2    WHAT KIND OF IMPRESSION DO YOU HAVE ABOUT THE XX SERVICE?
- ○ CONVENIENT
- ○ LOW PRICE
- ○ IT IS A LITTLE DIFFICULT FOR ME TO UNDERSTAND THE MENU.
- ○ OTHERS

RESPONDENT MAIL ADDRESS

(QUESTION VER. 2)
QUESTION 1    PLEASE ANSWER THE FOLLOWING QUESTION ABOUT THE XX SERVICE.
HAVE YOU EVER USED THE XX SERVICE?
- ● YES
- ○ NO

QUESTION 2    WHAT KIND OF IMPRESSION DO YOU HAVE ABOUT THE XX SERVICE?
- ○ CONVENIENT
- ○ LOW PRICE
- ● IT IS A LITTLE DIFFICULT FOR ME TO UNDERSTAND THE MENU.
- ○ OTHERS

RESPONDENT MAIL ADDRESS    abcde@xyz.ne.jp

| QUESTION ID | USEFUL RESPONSE | RESPONDENT MAIL ADDRESS | TYPE | NUMBER OF TIMES OF SELECTION |
|---|---|---|---|---|
| QUESTION 2 | IT IS A LITTLE DIFFICULT FOR ME TO UNDERSTAND THE MENU. | xxx@abc.com | ADDITIONAL CHOICE 1 | 27 |
| | | yyy@def.com | | |
| | | zzz@ghi.com | | |

| QUESTION ID | USEFUL RESPONSE | RESPONDENT MAIL ADDRESS | TYPE | NUMBER OF TIMES OF SELECTION |
|---|---|---|---|---|
| QUESTION 4 | I WISH TO MAKE SETTLEMENT ONLINE | xxx@abc.com | ADDITIONAL CHOICE 1 | 13 |
| | | aaa@ppp.com | | |
| | | bbb@qqq.com | | |
| | | ccc@rr.ne.jp | | |
| | | ddd@ss.ne.jp | | |

PROGRAM, APPARATUS, AND METHOD OF CONDUCTING QUESTIONNAIRE

BACKGROUND OF THE INVENTION

1) Field of the Invention

The present invention relates to a program, apparatus, and method of conducting a questionnaire online by using the Internet technique, capable of improving the quality of a questionnaire and increasing a response rate of questionnaire responses with high usefulness and originality.

2) Description of the Related Art

Conventionally, in order to make survey on a consumption trend and user consciousness, an apparatus for conducting questionnaires has been used so that the questionnaires are conducted online, in addition to questionnaires conducted using postcards and telephone.

This apparatus presents a questionnaire to questionnaire respondents by using e-mails or Web pages in the Internet, and collects responses to the questionnaire from the questionnaire respondents.

In order to improve the response rate of responses to the questionnaire, the apparatus provides services of giving points to the questionnaire respondents and exchanging cumulative points with gifts.

According to the conventional apparatus for conducting a questionnaire, prediction is made in advance about what kinds of opinions and impressions the questionnaire respondents might have, and a questionnaire is presented to the questionnaire respondents based on the prediction.

Implementers of questionnaires have an object of collecting responses having high usefulness and originality from the questionnaire respondents, and reflecting these responses in their product development. Therefore, the contents of the questionnaire are very important in order to obtain valuable responses with high usefulness and originality from the questionnaire respondents. In other words, when the contents of the questionnaire are appropriate, it becomes easy to obtain valuable opinions.

However, according to the conventional apparatus, a box where any opinion is freely described ("free-description box") is set in a questionnaire, and the questionnaire respondents are requested to freely describe their opinions and impressions in this box as responses to the questionnaire. Therefore, it is difficult to obtain responses with high usefulness and originality. This problem has been attributable to the fact that it is cumbersome and the questionnaire respondents feel embarrassed to fill in own opinions and impressions in the free-description box.

Further, according to the conventional apparatus, the improvement in the response rate has been targeted by giving points to the questionnaire respondents based on a simple method of giving points uniformly to the respondents each time when the questionnaire is responded, without depending on the contents of the questionnaire response.

However, according to the conventional apparatus, points are given to each questionnaire respondent when he or she has answered to most of questions in one questionnaire even if the free-description box has not been filled in. Therefore, in order to obtain points, the questionnaire respondents do not feel it necessary to dare to describe their opinions in the free-description box. As a result, it has been difficult for the questionnaire implementers to obtain responses with high usefulness and originality that the questionnaire implementers really want.

SUMMARY OF THE INVENTION

It is an object of this invention to provide a program, apparatus, and method of conducting a questionnaire capable of improving the quality of the questionnaire, and increasing a response rate to the questionnaire with high usefulness and originality.

The program for conducting a questionnaire according to one aspect of this invention, makes a computer function as a presenting unit that presents a questionnaire to questionnaire respondents, a collecting unit that collects responses to the questionnaire for analysis, and a correcting unit that corrects the questionnaire based on a result of collecting and analyzing the responses by the collecting unit as a collection result.

The apparatus for conducting a questionnaire according to another aspect of this invention, comprises a presenting unit that presents a questionnaire to questionnaire respondents, a collecting unit that collects responses to the questionnaire for analysis, and a correcting unit that corrects the questionnaire based on a result of collecting and analyzing the responses to the questionnaire by the collecting unit as a collection result.

The method of conducting a questionnaire according to still another aspect of this invention, comprises steps of presenting a questionnaire to questionnaire respondents, collecting responses to the questionnaire for analysis, and correcting the questionnaire based on a result of collecting and analyzing the responses as a collection result at the collecting step.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 is a diagram showing a table structure of a questionnaire information database 120 shown in FIG. 1, FIG. 3 is a diagram showing a table structure of a questionnaire response information database 130 shown in FIG. 1, FIG. 4 is a diagram showing a table structure of a useful response information database 140 shown in FIG. 1, FIG. 5 is a diagram showing a table structure of a point information database 150 shown in FIG. 1, FIG. 19 is a diagram showing a questionnaire screen 400 in the same embodiment, FIG. 20 is a diagram showing a questionnaire response screen 410 in the same embodiment, FIG. 21 is a diagram for explaining the search processing shown in FIG. 12, FIG. 22 is a diagram showing the questionnaire information database 120 in the questionnaire correction processing shown in FIG. 13, FIG. 23 is a diagram showing a mail 500 asking for a response to the questionnaire in the same embodiment, FIG. 24 is a diagram showing a revised questionnaire screen 420 in the same embodiment, FIG. 25 is a diagram showing a questionnaire screen 430 added with useful responses in the same embodiment, FIG. 26 is a diagram showing a questionnaire response screen 440 added with useful responses in the same embodiment, FIG. 27 is a diagram showing the useful response information database 140 in the processing for calculating the useful response point shown in FIG. 16.

DETAILED DESCRIPTION

An embodiment of the program, apparatus, and method of conducting a questionnaire according to the present invention will be explained in detail below with reference to the attached drawings.

Figure 1:
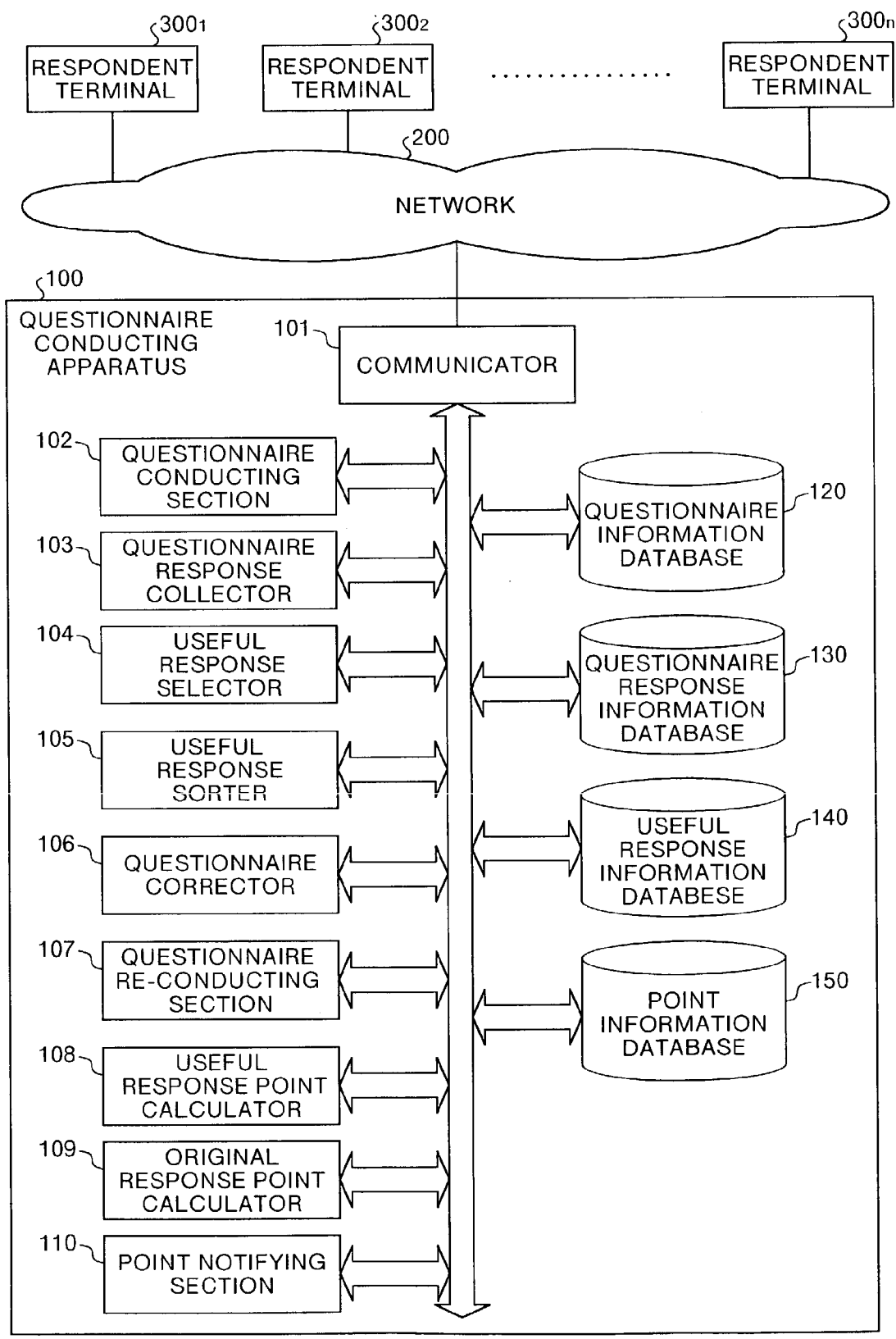
FIG. 1 is a block diagram showing a structure of one embodiment of the present invention.

FIG. 1 is a block diagram showing a structure of one embodiment of the present invention. FIG. 1 shows a system for conducting a questionnaire that comprises an apparatus for conducting a questionnaire ("questionnaire conducting apparatus") 100, and respondent terminals 300$_1$ to 300$_n$ that access the apparatus 100 via a network 200 respectively to make responses to questionnaires.

The apparatus 100 is accessed by the respondent terminals 300$_1$ to 300$_n$ via the network 200 so that questionnaires are implemented via a Web screen.

This apparatus 100 has a function of conducting questionnaires, a function of collecting responses to the questionnaires, a function of selecting useful responses from a result of the collection, a function of reflecting useful responses in the questionnaires, and a function of giving points to questionnaire respondents based on the usefulness and originality of the responses to the questionnaires.

In the apparatus 100, a communicator 101 controls communications with the respondent terminals 300$_1$ to 300$_n$ according to communication protocols such as the TCP/IP (transmission control protocol/Internet protocol) and the like.

A questionnaire conducting section 102 has a function of presenting questionnaires to any one of the respondent terminals 300$_1$ to 300$_n$ and conducting questionnaires. Specifically, the questionnaire conducting section 102 presents a questionnaire screen 400 shown in FIG. 19 based on a questionnaire information database 120 to prompt the respondent terminal to respond to the questionnaire on a questionnaire response screen 410 shown in FIG. 20.

The questionnaire screen 400 is a Web screen for conducting a questionnaire including a plurality of questions and choices to the questions.

The questionnaire information database 120 stores questionnaire information, and has fields of "question ID", "corrected version", "type", and "item" as shown in FIG. 2.

The "question ID" is an identifier that identifies a question. The "corrected version" is a version number of each question, and this version number is incremented by one each time when the question is corrected. When the "corrected version" is 1, this shows that this question is the original. The "type" shows contents described in the "item" such as "question text", "initial choice 1", "initial choice 2", and "free description".

For example, in the question 2, the "question text" means a text showing "What kind of impression do you have on the XX service?" as the contents of the question. The "initial choice 1" means that "The service is convenient" set in the "item" shows a first choice as the response to the question.

The "initial choice 2" means that "The service is at low price." set in the "item" shows a second choice as the response to the question. The "free description" means that the questionnaire respondent is expected to describe free opinions and impressions in the "others" that is set in the "item".

The questionnaire information in the questionnaire information database 120 corresponds to the questionnaire screen 400 shown in FIG. 19. The questions 1 and 2, choices for the questions, a free-description box 401 corresponding to the "others", and a box for entering a respondent mail address are set respectively in this questionnaire screen 400.

The questionnaire respondent describes opinions and impressions in the free-description box 401. This free-description box 401 is set to allow a questionnaire implementer to obtain responses having high usefulness and originality.

The questionnaire respondent selects an answer to each question on the questionnaire screen 400, describes any comment in the free-description box 401, and enters the mail address in the box for the respondent mail address. The response to the questionnaire has been completed. A result of the response made to the questionnaire becomes as shown in the questionnaire response screen 410 shown in FIG. 20.

Referring back to FIG. 1, a questionnaire response collector 103 collects responses to the questionnaire based on the questionnaire response screen 410 shown in FIG. 20, and stores a result of the collection into the questionnaire response information database 130 as questionnaire response information.

The questionnaire response information database 130 stores a plurality of questionnaire response information, and has fields of "respondent mail address", "version of responded questionnaire", "question ID", "selected choice", and "contents of free description", as shown in FIG. 3.

The respondent mail address" is a mail address of a questionnaire respondent entered in the box for the respondent mail address on the questionnaire response screen 410 (refer to FIG. 20). The "version of responded questionnaire" is a version number of the question. The "question ID" is an identifier that identifies a question, and this corresponds to the "question ID" in the questionnaire information database 120 (refer to FIG. 2).

The "selected choice" is one of the choices (the initial choices 1 and 2, and the free description), selected as a response, corresponding to the question. The "contents of free description" is the contents described in the free-description box 401 on the questionnaire response screen 410 (refer to FIG. 20) when free description has been selected as a selected choice.

Referring back to FIG. 1, a useful response selector 104 has a function of selecting a useful response from the questionnaire response screen. The useful response has high usefulness among opinions that have been described in the free-description box. This useful response has been added to the questionnaire information as an additional choice.

Specifically, when the questionnaire response screen includes an additional choice, the useful response selector 104 decides whether this additional choice has been selected. When the additional choice has been selected, the useful response selector 104 increments by one the "number of times of selection" on the useful response information database 140 shown in FIG. 4.

The useful response information database 140 stores useful response information, and has fields of "question ID", "useful response", "respondent mail address", "type", and "number of times of selection" as shown in FIG. 4.

The "question ID" is an identifier that identifies a question, and this corresponds to the "question ID" in the questionnaire information database 120 (refer to FIG. 2). The "useful response" means a response that has high usefulness among opinions described in the free-description box on the questionnaire response screen and that has been added to the questionnaire information as an additional choice (for example, "It is a little difficult for me to understand the menu." in the free-description box 401 shown in FIG. 20).

The "respondent mail address" is a mail address of a respondent who has described the "useful response" in the free-description box as a response to the question. This mail address corresponds to the respondent mail address shown in FIG. 20. The "type" shows "useful response", and this is the additional choice 1 or the like shown in FIG. 20. The "number of times of selection" shows a number of times when the questionnaire respondent has selected the "useful response".

Referring back to FIG. 1, a useful response sorter 105 has a function of sorting out an opinion having high usefulness as a useful response from among opinions described in the free-description box, and storing this useful response information into the useful response information database 140 shown in FIG. 4.

A questionnaire corrector 106 has a function of correcting the questionnaire by adding an additional choice to the questionnaire information in the questionnaire information database 120 (refer to FIG. 22), based on the useful response information stored in the useful response information database 140 (refer to FIG. 4).

A questionnaire re-conducting section 107 has a function of conducting a questionnaire again, by using the questionnaire corrected by the questionnaire corrector 106, to the questionnaire respondents who have responded to the questionnaire before correcting the questionnaire.

A useful response point calculator 108 calculates points (hereinafter to be referred to as useful response points) that are to be given to the questionnaire respondents according to the usefulness of the contents described in the free-description box. An original response point calculator 109 calculates points (hereinafter to be referred to as original response points) that are to be given to the questionnaire respondents according to the originality of the contents described in the free-description box.

A point notifying section 110 has a function of calculating a total point based on the useful response points and the original response points, notifying the questionnaire respondent of this point, and storing point information into a point information database 150. The cumulative points can be exchanged with gifts or services, and these points are used to obtain responses having high usefulness and originality from the questionnaire respondents.

The point information database 150 stores point information relating to the points calculated by the point notifying section 110. Specifically, the point information database 150 has fields of "respondent mail address" and "point" as shown in FIG. 5.

The "respondent mail address" is a mail address of a questionnaire respondent, and this corresponds to the respondent mail address on the questionnaire response screen 410. The "point" is calculated by the point notifying section 110.

Referring back to FIG. 1, each of the respondent terminals $300_1$ to $300_n$ is a computer terminal installed at each questionnaire respondent side, and has a function of carrying out communications according to the TCP/IP, a function of browsing a Web screen, and a function of transmitting/receiving e-mails.

Figure 6:
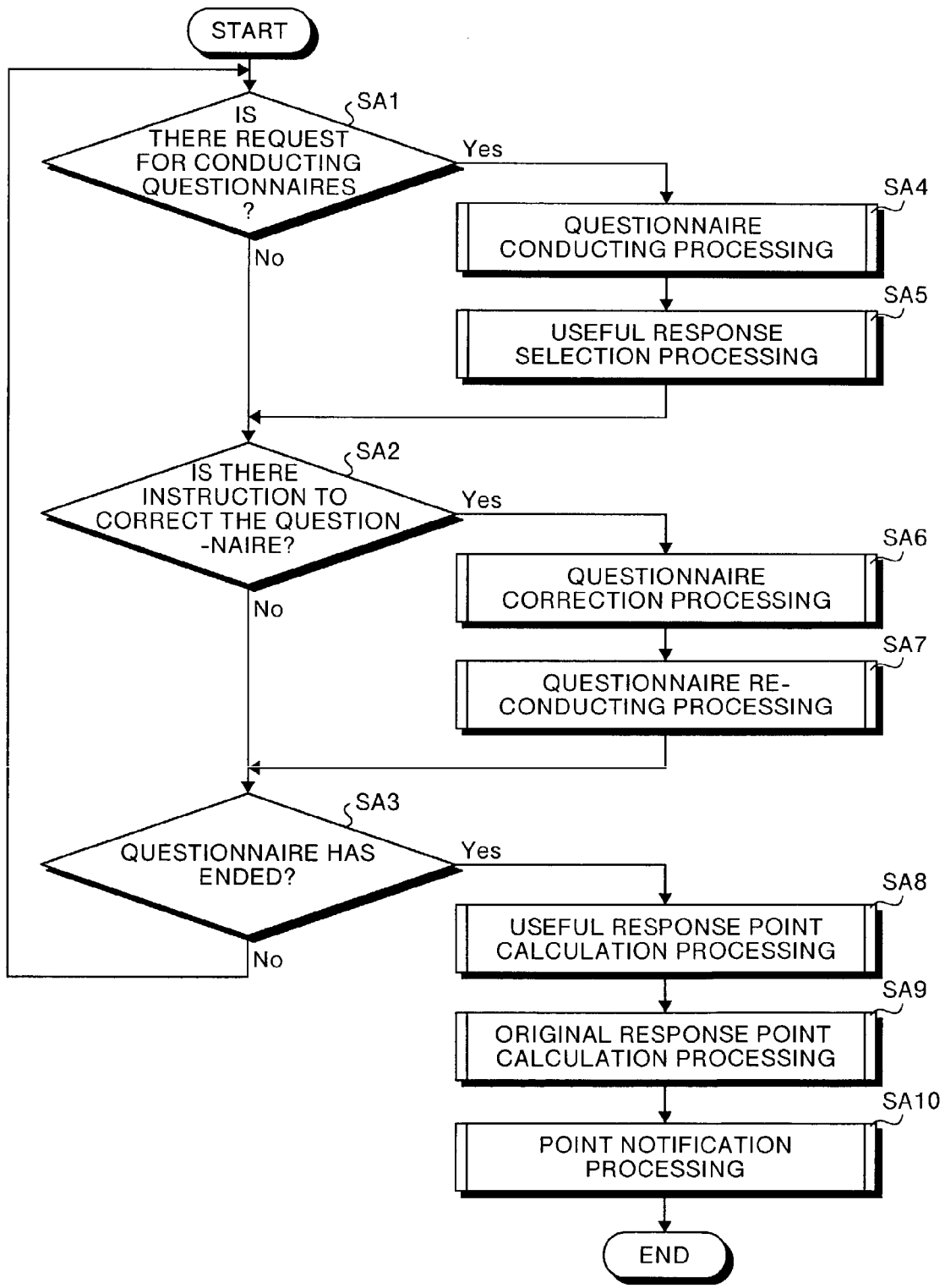
FIG. 6 is a flowchart for explaining the operation in the same embodiment.

The operation of the questionnaire conducting apparatus in this embodiment will be explained with reference to the flowcharts shown in FIG. 6 to FIG. 18 and drawings shown in FIG. 19 to FIG. 28 respectively. FIG. 6 is the flowchart for explaining the operation of the embodiment.

At step SA1 in FIG. 6, the questionnaire conducting section 102 of the questionnaire conducting apparatus 100 shown in FIG. 1 decides whether there has been a request for conducting questionnaires from any one of the respondent terminals $300_1$ to $300_n$ via the network 200. The questionnaire conducting section 102 sets "No" as a result of this decision.

At step SA2, the questionnaire corrector 106 decides whether the manager has instructed to correct a questionnaire, after a preset number of responses to the questionnaire have been collected. The questionnaire corrector 106 sets "No" as a result of this decision.

At step SA3, the useful response point calculator 108 decides whether the manager has instructed to end the questionnaire. The useful response point calculator 108 sets "No" as a result of this decision. The processing at step SA1 to step SA3 is carried out repeatedly until when a result of the decision becomes "Yes".

When the respondent terminal $300_1$ has accessed the apparatus 100 and issued a request for conducting a questionnaire via the network 200, the questionnaire conducting section 102 sets "Yes" as a result of the decision made at step SA1.

At step SA4, the processing for conducting a questionnaire ("questionnaire conducting processing") is carried out to the questionnaire respondent at the respondent terminal $300_1$. Specifically, at step SB1 shown in FIG. 7, the questionnaire conducting section 102 executes the processing for presenting the questionnaire to the questionnaire respondent.

Figure 8:
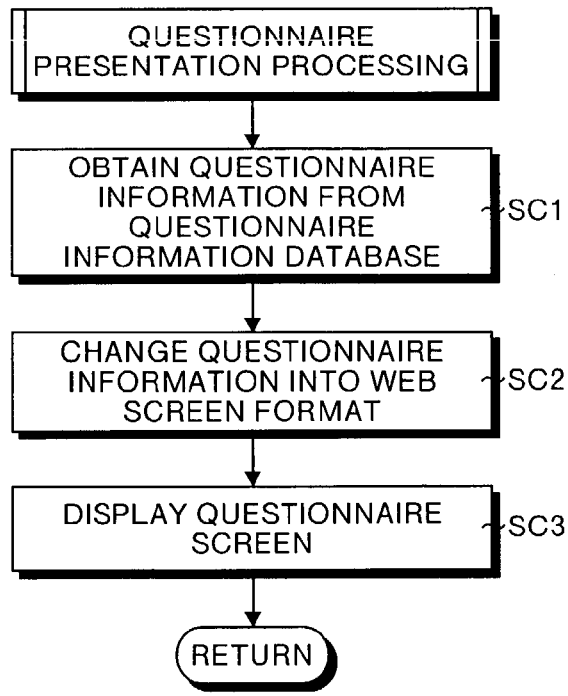
FIG. 8 is a flowchart for explaining the operation for presenting a questionnaire shown in FIG. 7.

In other words, in the processing for presenting the questionnaire shown in FIG. 8, at step SC1, the questionnaire conducting section 102 obtains questionnaire information from the questionnaire information database 120 (refer to FIG. 2). At step SC2, the questionnaire conducting section 102 changes the obtained questionnaire information into a Web screen format.

At step SC3, the questionnaire conducting section 102 makes the questionnaire screen 400 shown in FIG. 19 corresponding to the formatted questionnaire information displayed to the respondent terminal $300_1$.

Referring back to FIG. 7, at step SB2, the questionnaire conducting section 102 decides whether responses to the questionnaire have ended using the questionnaire screen 400. The questionnaire conducting section 102 sets "No" as a result of the decision. The questionnaire conducting section 102 repeats the processing for making decision.

On the other hand, the questionnaire respondent responds to the questionnaire by checking (selecting) a choice of each question on the questionnaire screen 400 shown in FIG. 19. At the same time, the questionnaire respondent enters the respondent mail address. A result of the response is as shown on the questionnaire response screen 410 in FIG. 20. At the question 2, the questionnaire respondent selects the "others" and describes "It is a little difficult for me to understand the menu." in the free-description box 401.

Figure 7:
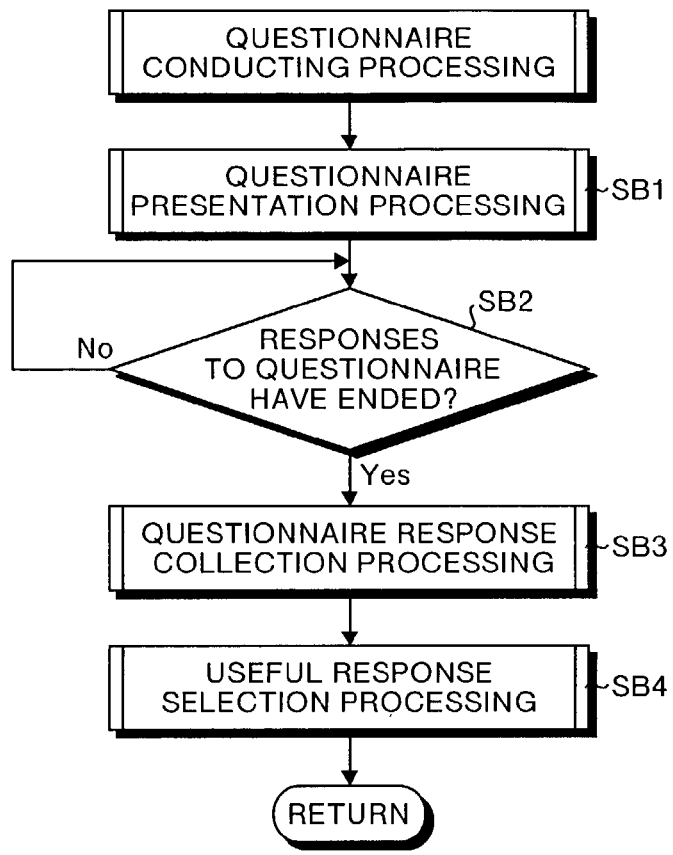
FIG. 7 is a flowchart for explaining the processing for conducting a questionnaire shown in FIG. 6.

When the questionnaire respondent has depressed a response end button not shown, the questionnaire conducting section 102 sets "Yes" as a result of the decision made at step SB2 shown in FIG. 7. At step SB3, the questionnaire response collector 103 executes the processing for collecting the questionnaire response.

Figure 9:
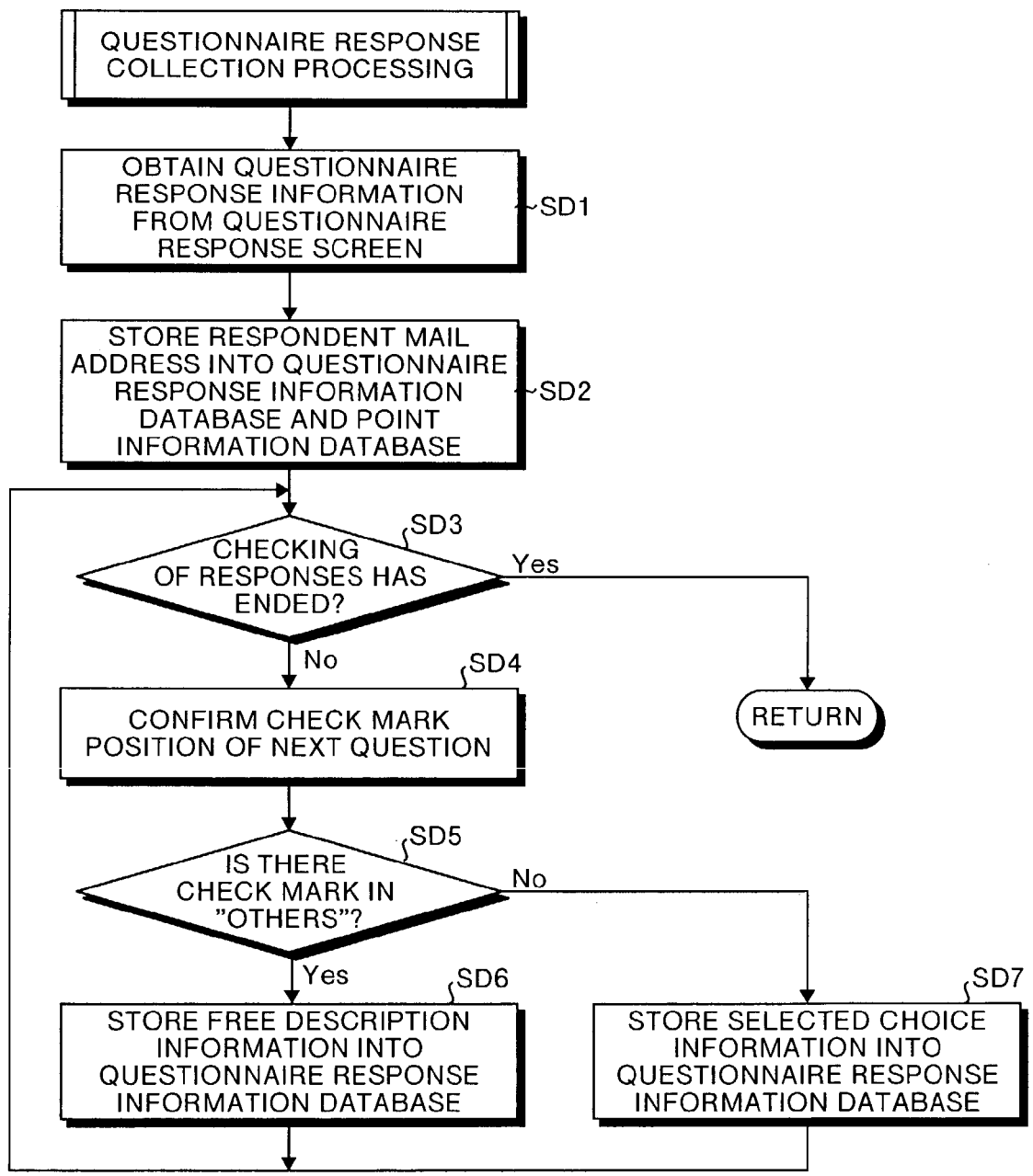
FIG. 9 is a flowchart for explaining the processing for collecting a questionnaire response shown in FIG. 7.
Figure 10:
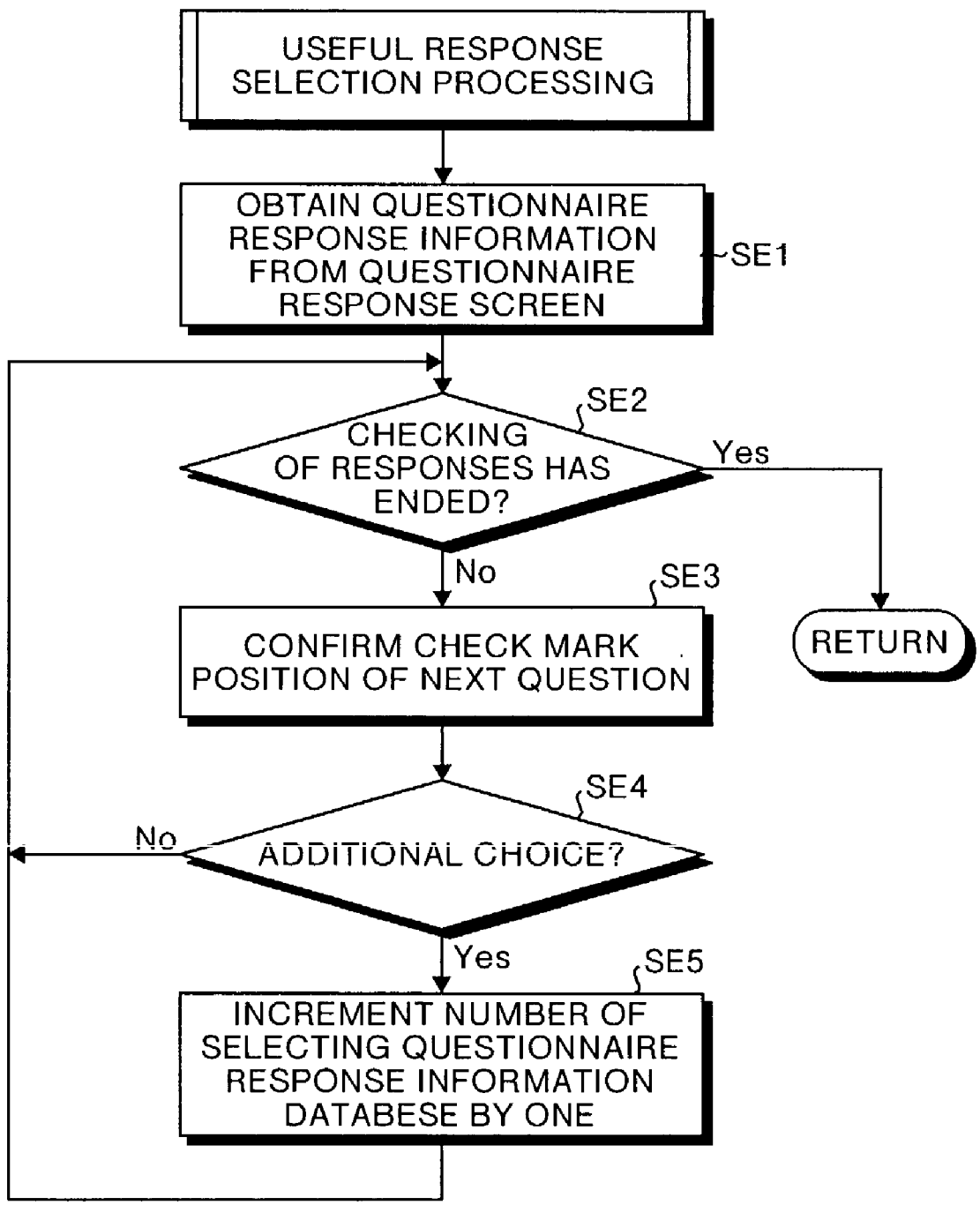
FIG. 10 is a flowchart for explaining the processing for selecting a useful response shown in FIG. 7.
Figure 11:
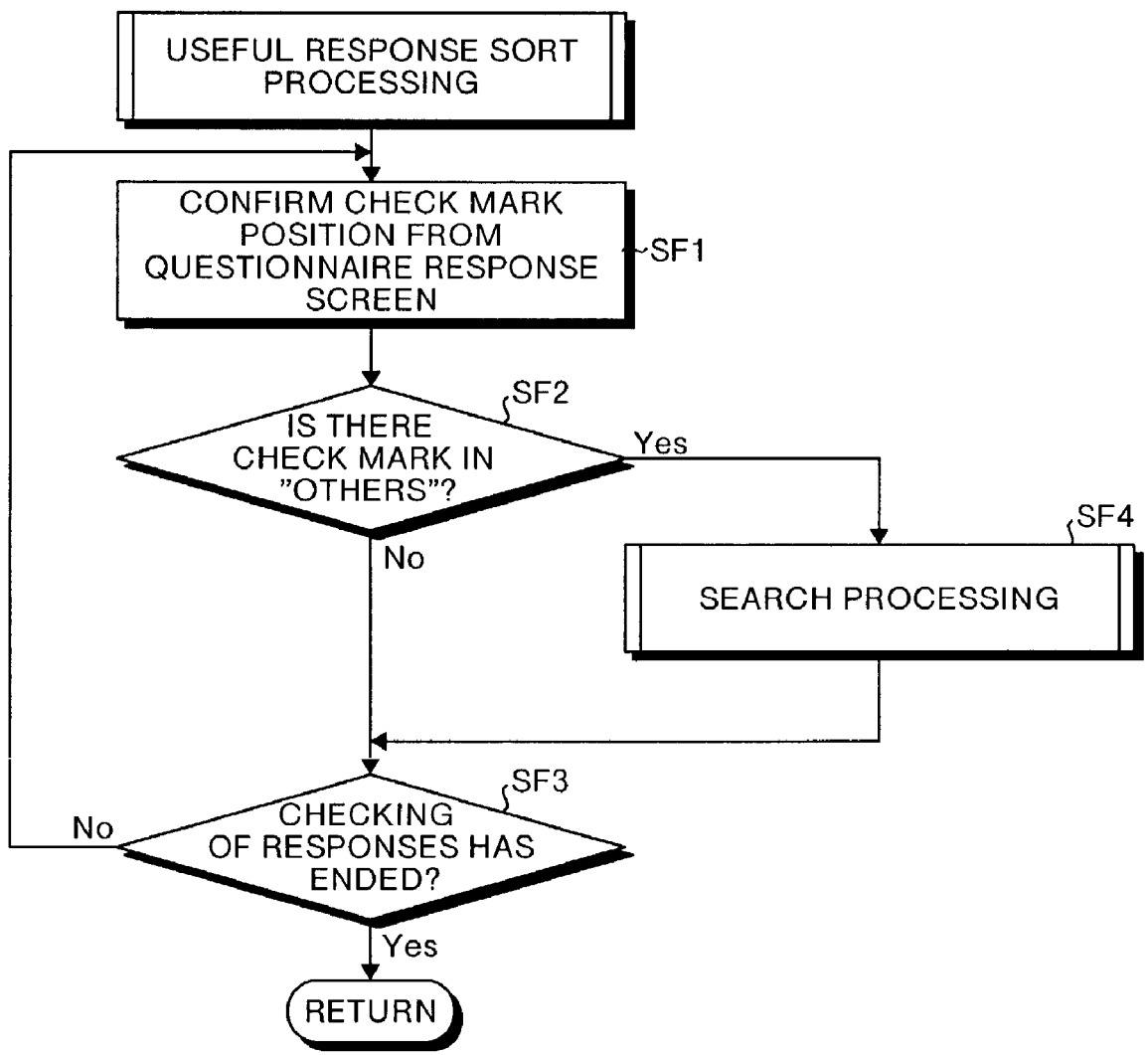
FIG. 11 is a flowchart for explaining the processing for sorting a useful response shown in FIG. 6.

At step SD1 shown in FIG. 9, the questionnaire response collector 103 obtains questionnaire response information from the questionnaire response screen 410 shown in FIG. 20. At step SD2, the questionnaire response collector 103 obtains a respondent mail address from the questionnaire response screen 410, and stores the obtained mail address into the questionnaire response information database 130 (refer to FIG. 3) and the point information database 150 (refer to FIG. 5) respectively.

At step SD3, the questionnaire response collector 103 decides whether the checking of responses in the questionnaire response information obtained at step SD1 has ended. The questionnaire response collector 103 sets "No" as a result of the decision. At step SD4, the questionnaire response collector 103 checks a check mark position as a response made to the next question (the question 1 shown in FIG. 20, in this example). The choice of "Yes" is checked in this example.

At step SD5, the questionnaire response collector 103 decides whether a check mark exists in the "others". In this example, as there is the check mark in the "Yes" referring to the question 1 shown in FIG. 20, the questionnaire response collector 103 sets "No" as a result of the decision. At step SD7, the questionnaire response collector 103 stores the "question 1" into the "question ID" and stores the "initial choice 1" (corresponding to "Yes") into the "selected choice" of the questionnaire response information database 130 shown in FIG. 3.

At step SD3, the questionnaire response collector 103 decides whether the checking of responses in the questionnaire response information obtained at step SD1 have been ended. The questionnaire response collector 103 sets "No" as a result of the decision. At step SD4, the questionnaire response collector 103 checks a check mark position as a response made to the next question (the question 2 shown in FIG. 20, in this example). The choice of "others" is checked in this example.

At step SD5, the questionnaire response collector 103 decides whether a check mark exists in the "others". As there is the check mark in the "others", the questionnaire response collector 103 sets "Yes" as a result of the decision. At step SD6, the questionnaire response collector 103 stores the "question 2" into the "question ID", stores the "free description" (corresponding to "others") into the "selected choice", and stores "It is a little difficult for me to understand the menu." into the "contents of free description" in the questionnaire response information database 130 shown in FIG. 3.

At step SD3, the questionnaire response collector 103 decides whether the checking of the responses in the questionnaire response information obtained at step SD1 has ended. The questionnaire response collector 103 sets "Yes" as a result of the decision.

Referring back to FIG. 7, at step SB4, the useful response selector 104 executes the processing for selecting a useful response. Specifically, at step SE1 shown in FIG. 10, the useful response selector 104 obtains questionnaire response information from the questionnaire response screen 410 shown in FIG. 20. It is assumed that, at this point of time, any useful response information has not been stored in the useful response information database 140 (refer to FIG. 4).

At step SE2, the useful response selector 104 decides whether the checking of responses in the questionnaire response information obtained at step SE1 has ended. The useful response selector 104 sets "No" as a result of the decision.

At step SE3, the useful response selector 104 checks a check mark position as a response made to the next question (the question 1 shown in FIG. 20, in this example). The choice of "Yes" is checked in this example.

At step SE4, the useful response selector 104 decides whether the "type" of the option at the check mark position is an additional choice by referring to the questionnaire information database 120 (refer to FIG. 2). As the type is the "initial choice 1", the useful response selector 104 sets "No" as a result of the decision.

At step SE2, the useful response selector 104 decides whether the checking of responses in the questionnaire response information obtained at step SE1 has ended, and sets "No" as a result of the decision in this case.

At step SE3, the useful response selector 104 checks a check mark position as a response made to the next question (the question 2 shown in FIG. 20, in this example). The choice of "others" is checked in this case.

At step SE4, the useful response selector 104 decides whether the "type" of the option at the check mark position is an additional choice by referring to the questionnaire information database 120 (refer to FIG. 2). As the type is the "free description", the useful response selector 104 sets "No" as a result of the decision. At step SE2, the useful response selector 104 sets "Yes" as a result of the decision. Then, the questionnaire conducting processing at step SA4 shown in FIG. 6 is ended.

At step SA5, the useful response sorter 105 executes the processing for sorting a useful response. Specifically, at step SF1 shown in FIG. 11, the useful response sorter 105 obtains questionnaire response information from the questionnaire response screen 410 shown in FIG. 20, and confirms a check mark position based on this information.

More specifically, the useful response sorter 105 checks a check mark position as a response made to the next question (the question 1 shown in FIG. 20, in this example) The choice of "Yes" is checked in this example.

At steps SF2, the useful response sorter 105 decides whether a check mark exists in the "others". As the check mark exists in the "Yes", the useful response sorter 105 sets "No" as a result of the decision.

At step SF3, the useful response sorter 105 decides whether the checking of responses in the questionnaire response information obtained at step SF1 has ended. The useful response sorter 105 sets "No" as a result of the decision.

At step SF1, the useful response sorter 105 checks a check mark position as a response made to the next question (the question 2 shown in FIG. 20, in this example). The choice of "others" is checked in this example.

At step SF2, the useful response sorter 105 decides whether a check mark exists in the "others", and sets "Yes" as a result of the decision in this case. At step SF4, the useful response sorter 105 executes search processing used to decide whether the information described in the free-description box 401 of the "others" shown in FIG. 20 is a useful response.

Figure 12:
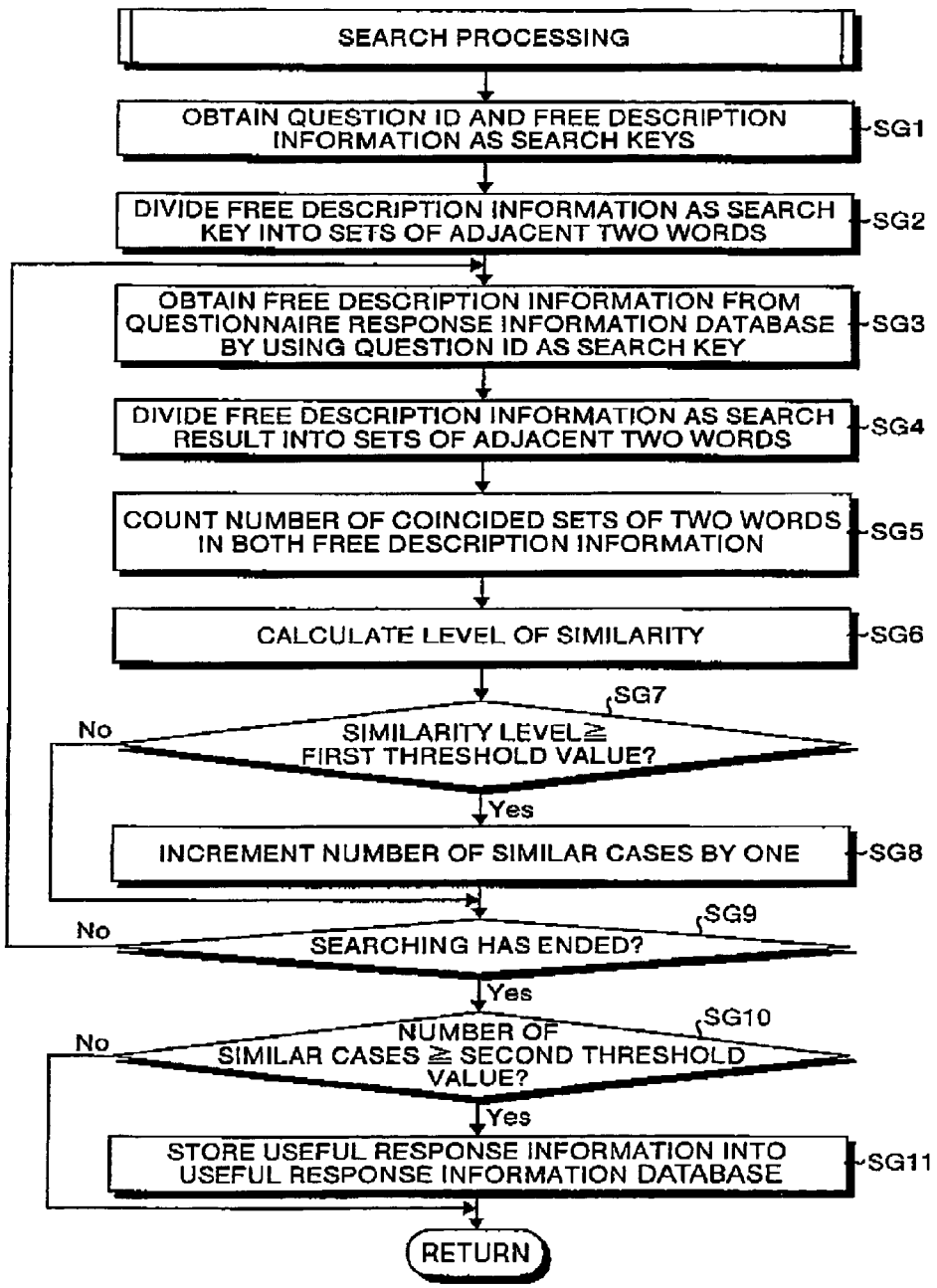
FIG. 12 is a flowchart for explaining the search processing shown in FIG. 11.

Specifically, at step SG1 shown in FIG. 12, the useful response sorter 105 obtains the information ("It is a little difficult for me to understand the menu." in this example) described in the free-description box 401 shown in FIG. 20 and the question ID (the question 2, in this example) corresponding to this information, and uses these as search keys.

At step SG2, the useful response sorter 105 divides "It is a little difficult for me to understand the menu." (the freely descried information ("free description information")) as the search key into sets each with adjacent two words as shown in FIG. 21.

At step SG3, the useful response sorter 105 obtains free description information described by other questionnaire respondents from the questionnaire response information database 130 (excluding the questionnaire response information of this respondent) shown in FIG. 3, by using the question ID (=the question 2) obtained at step SG1 as a search key.

It is assumed in this case that "It is a bit hard to understand the menu" shown in FIG. 21 as the free description information has been obtained from the questionnaire response information database 130.

At step SG4, the useful response sorter 105 divides the free description information "It is a bit hard to understand the menu" as a result of the search, into sets of adjacent two words as shown in FIG. 21. At step SG5, the useful response sorter 105 compares the result of the division at step SG2 with the result of the division at step SG4, and counts the number of sets of two words that coincide with each other, as shown in FIG. 21. The number of sets of two words that coincide is five, in this example.

At step SG6, the useful response sorter 105 calculates a level of similarity between the free description information as the search key described in the free-description box 401 (refer to FIG. 20) and the free description information as the search result obtained from the questionnaire response information database 130, from the following equation (1).

Similarity level=(number of coincidence)/(total number of sets of two words in the search key) (1)

The similarity level is calculated as 0.5 (=5/10) in this example, as shown in FIG. 21.

At step SG7, the useful response sorter 105 decides whether the similarity level calculated at step SG6 is equal to or above a first threshold value (for example, 0.5). When the similarity level is equal to or above the first threshold value, the free description information described in the free-description box 401 becomes a candidate of the useful response.

The useful response sorter 105 sets "Yes" as a result of the decision made at step SG7. At step SG8, the useful response sorter 105 increments the number of similar cases by one. When a result of the decision made at step SG7 is "No", the useful response sorter 105 makes decision at step SG9.

At step SG9, the useful response sorter 105 decides whether the search at step SG3 has ended. The useful response sorter 105 sets "No" as a result of the decision. At step SG3 and then on, the similarity level is calculated and the number of similar cases is counted.

When the result of the decision made at step SG9 is "Yes", the useful response sorter 105 decides at step SG10 whether the number of similar cases is equal to or above a second threshold value (10 cases, for example). When the result of the decision is "No", the search processing is ended.

When there are 10 cases or more of free description information described by other questionnaire respondents that have high similarity to the free description information described in the free-description box 401 shown in FIG. 20, the useful response sorter 105 sets "Yes" as a result of the decision. At step SG11, the useful response sorter 105 stores the free description information described in the free-description box 401 as a useful response, into the useful response information database 140 shown in FIG. 4.

The question 2 is stored into the "question ID". Mail addresses of the questionnaire respondents who described the free description information that have completely coincided with the useful response or have similarity levels equal to or higher than the first threshold value are stored into the "respondent mail address". The additional choice 1 is stored into the "type" and zero is stored into the "number of times of selection".

Referring back to FIG. 11, at step SF3, the useful response sorter 105 decides whether the checking of responses has ended, and sets "No" as a result of the decision in this example. Thereafter, the processing at step SF1 and then on is executed.

When the checking of responses has ended, the useful response sorter 105 sets "Yes" as a result of the decision made at step SF3. Thereafter, each time when there has been a request for conducting questionnaires, the questionnaire conducting processing (step SA4) and the processing for selecting a useful response ("useful response selection processing") (step SA5) shown in FIG. 6 are executed repeatedly.

When a predetermined number of responses to the questionnaire are collected, the manager issues an instruction to the questionnaire conducting apparatus 100 to correct the questionnaire using a manager terminal not shown.

Based on this, the questionnaire corrector 106 sets "Yes" as a result of the decision made at step SA2 shown in FIG. 6. At step SA6, the questionnaire corrector 106 executes the questionnaire correction processing to reflect the useful responses as additional choices in the questionnaire information.

Figure 13:
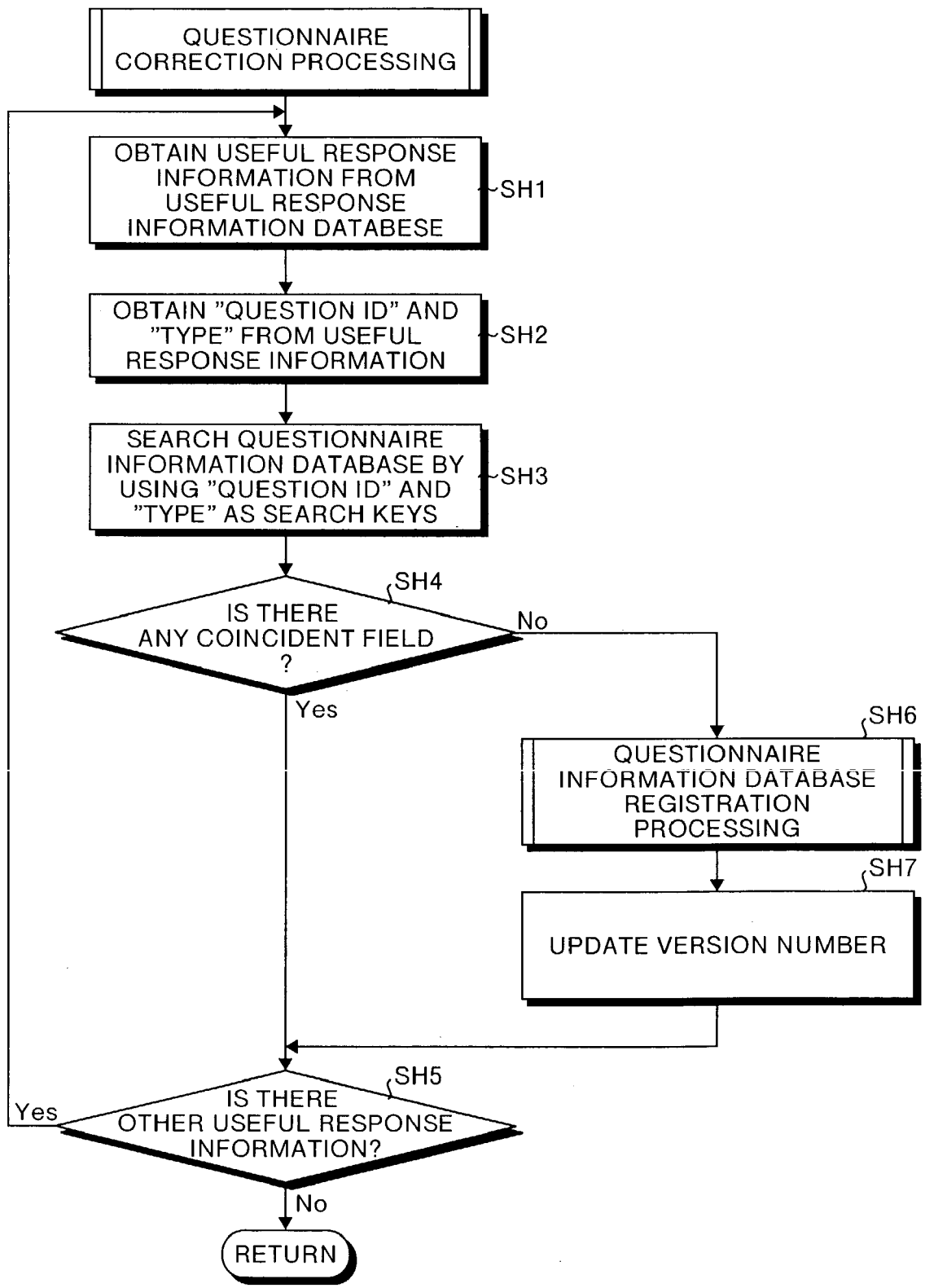
FIG. 13 is a flowchart for explaining the processing for correcting a questionnaire shown in FIG. 6.
Figure 14:
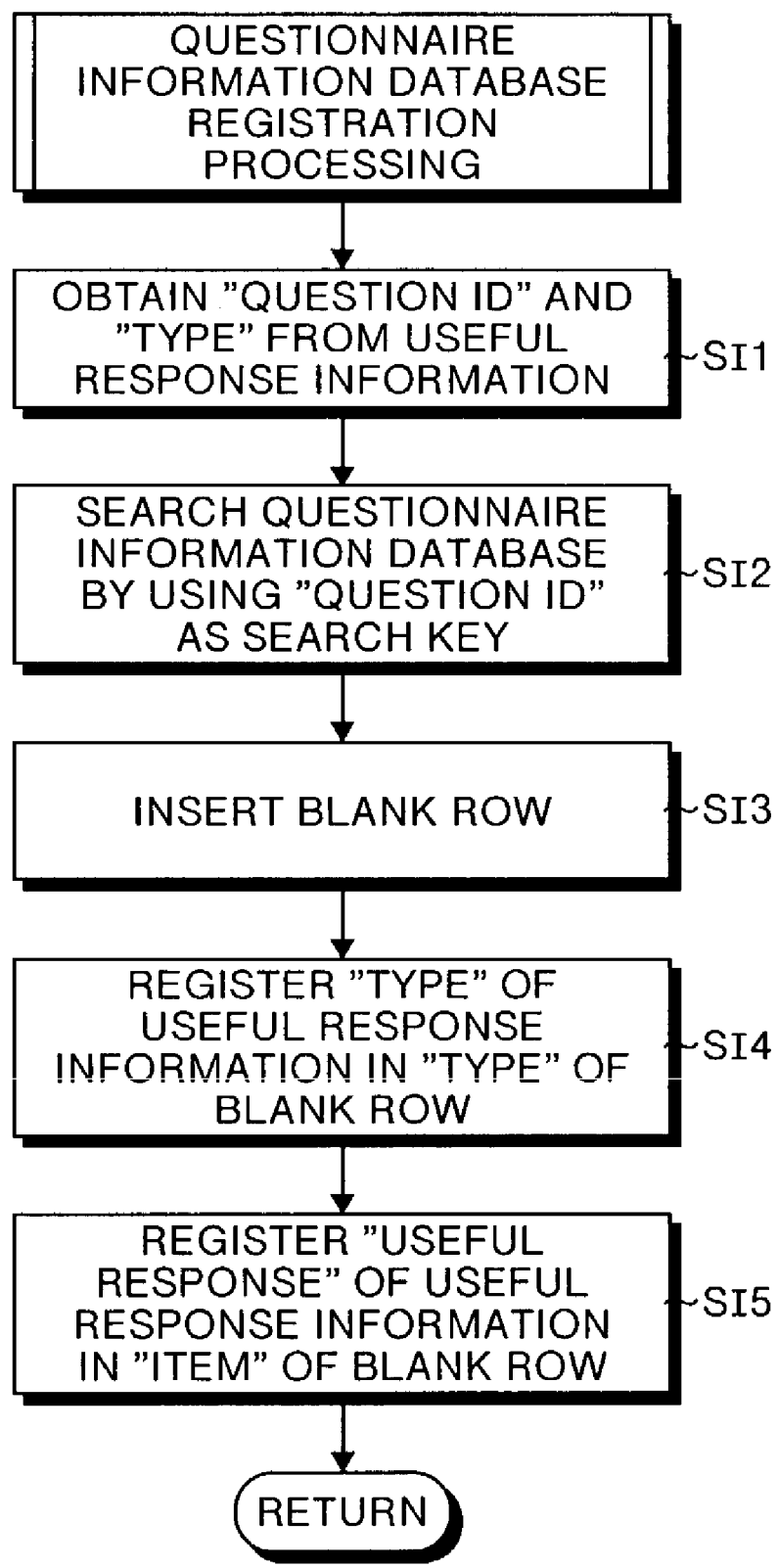
FIG. 14 is a flowchart for explaining the processing for registering a questionnaire information database shown in FIG. 13.

At step SH1 shown in FIG. 13, the questionnaire corrector 106 obtains one piece of useful response information from the useful response information database 140 (refer to FIG. 4). At step SH2, the questionnaire corrector 106 obtains the "question ID" (the question 2, in this example) and the "type" (the additional choice 1, in this example) from the obtained useful response information.

At step SH3, the questionnaire corrector 106 searches the questionnaire information database 120 (refer to FIG. 2) using the "question ID" and the "type" obtained at step SH2 as search keys.

At step SH4, the questionnaire corrector 106 decides whether there is any coincident field as a result of the searching at step SH3, and sets "No" as a result of the decision in this example. When a result of the decision made at step SH4 is "Yes", the questionnaire corrector 106 makes decision at step SH5, because the questionnaire has already been corrected.

At step SH6, the questionnaire corrector 106 executes the processing for registering the questionnaire information database. Specifically, at step SI1 shown in FIG. 14, the questionnaire corrector 106 obtains the "question ID" (the question 2, in this example) and the "type" (the additional choice 1, in this example) from the useful response information obtained at step SH1 (refer to FIG. 13).

At step SI2, the questionnaire corrector 106 searches the questionnaire information database 120 shown in FIG. 2 using the "question ID" (=the question 2) as a search key. At step SI3, the questionnaire corrector 106 inserts a blank row in a space above the row where the "free description" is entered in the "type" column, as a result of the searching (the record of the question 2) the questionnaire information database 120.

At step SI4, the questionnaire corrector 106 registers "additional choice 1" as a type of useful response information in the "type" column of the blank row as shown in FIG. 22. At step SI5, the questionnaire corrector 106 registers the useful response (It is a little difficult for me to understand the menu.) of useful response information in the "item" column of the blank row. Accordingly, the useful response is added as a choice of the question, and the questionnaire information is corrected.

At step SH7 shown in FIG. 13, the questionnaire corrector 106 updates the version number of the "corrected version" by incrementing the version number by one. The version number corresponds to the question for which the useful response is added as additional choice in the questionnaire information database 120. In the example shown in FIG. 22, the "corrected version" corresponding to the question 2 shown in FIG. 2 is updated from 1 to 2.

Referring back to FIG. 13, at step SH5, the questionnaire corrector 106 decides whether there is any other useful response information in the useful response information database 140. The questionnaire corrector 106 sets "Yes" as a result of the decision. Thereafter, at step SH1 and then on, a useful response is added to the questionnaire information as an additional choice, in the same manner as above. Referring back to FIG. 6, at step SA7, the processing for re-conducting a questionnaire is executed to the questionnaire respondents who have responded before the correction, by using the corrected questionnaire information.

Figure 15:
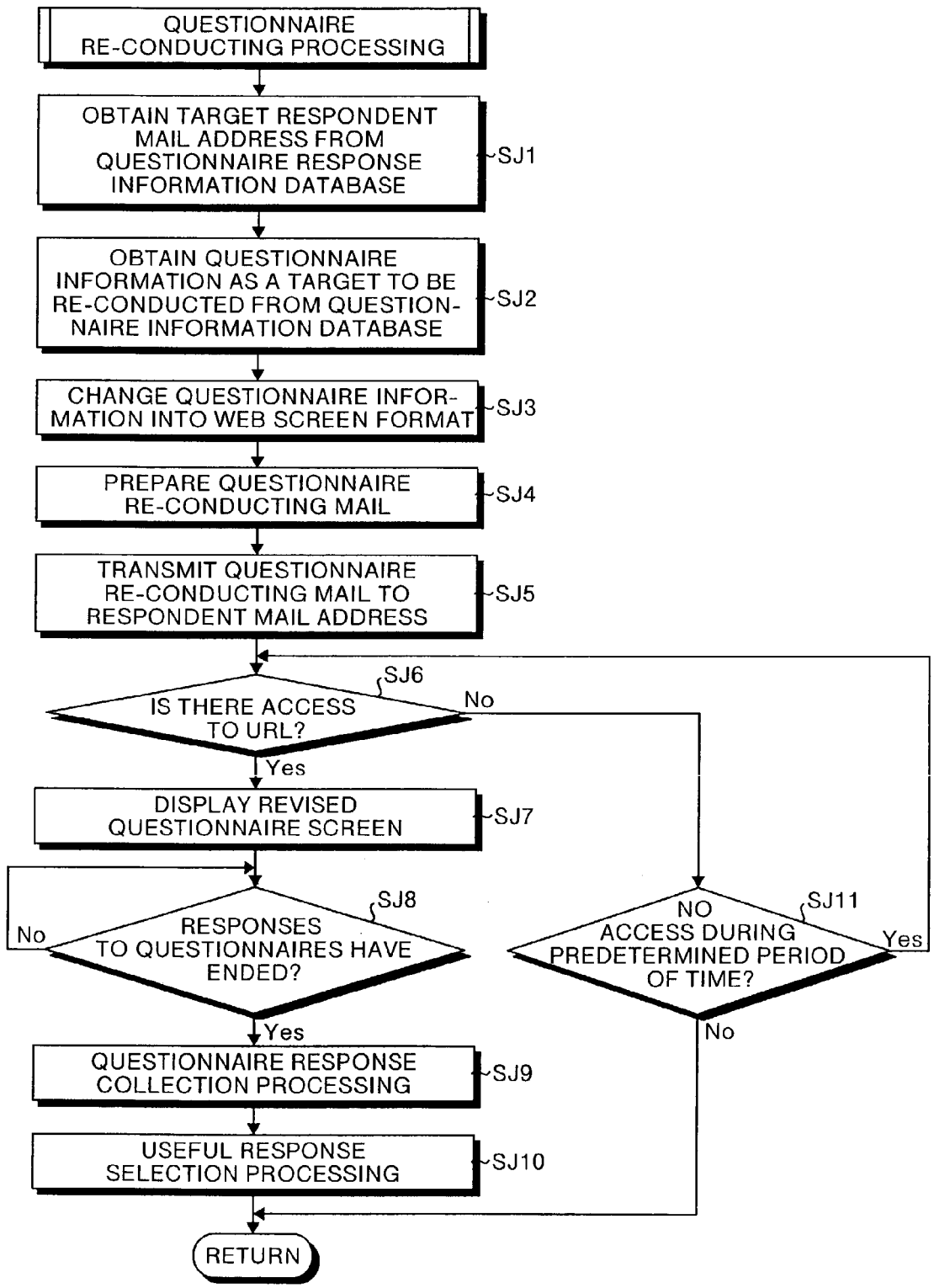
FIG. 15 is a flowchart for explaining the processing for re-conducting a questionnaire shown in FIG. 6.

Specifically, at step SJ1 shown in FIG. 15, the questionnaire re-conducting section 107 obtains questionnaire response information that includes information of an earlier version number than that of a search key from the questionnaire response information database 130 (refer to FIG. 3) by using the "corrected version" updated at step SH7 (refer to FIG. 13) as the search key.

The questionnaire re-conducting section 107 obtains a respondent mail address as an address to which questionnaire re-conducting is notified from the obtained questionnaire response information. At step SJ2, the questionnaire re-conducting section 107 obtains questionnaire information for the questionnaire to be re-conducted (the questionnaire including the additional choice 1, in this case) from the questionnaire information database 120 shown in FIG. 22.

At step SJ3, the questionnaire re-conducting section 107 changes the obtained questionnaire information into a Web screen format, and stores this questionnaire information into a preset URL (uniform resource locator). At step SJ4, the questionnaire re-conducting section 107 prepares a mail 500 asking for a response to the re-conducted questionnaire ("questionnaire re-conducting mail") shown in FIG. 23.

The questionnaire re-conducting mail 500 is an e-mail to be sent to those who are to be questioned again to request them to respond to the questionnaire and to notify them of a target URL of access. The questionnaire re-conducting mail 500 is prepared for the number of respondent mail addresses obtained at step SJ1.

At step SJ5, the questionnaire re-conducting section 107 transmits the questionnaire re-conducting mail 500 prepared at step SJ4 to the respondent mail addresses obtained at step SJ1.

At step SJ6, the questionnaire re-conducting section 107 decides whether a respondent terminal (the respondent terminal $300_1$, for example) as the transmission destination of the questionnaire re-conducting mail 500 has accessed the URL described in the questionnaire re-conducting mail 500, and sets "No" as a result of the decision, in this example.

At step SJ11, the questionnaire re-conducting section 107 decides whether no access has been made to the URL during a predetermined period of time, and sets "Yes" as a result of the decision in this example. When the result of the decision made at step SJ11 is "No", the questionnaire re-conducting section 107 judges that the questionnaire respondent has no intention to respond to the re-conducted questionnaire, and ends the questionnaire re-conducting processing.

When the respondent terminal $300_1$ has accessed the URL, the questionnaire re-conducting section 107 sets "Yes" as a result of the decision made at step SJ6. At step SJ7, the questionnaire re-conducting section 107 makes a revised questionnaire screen 420 shown in FIG. 24 corresponding to the questionnaire information obtained at step SJ2 displayed to the respondent terminal $300_1$.

The choice "It is a little difficult for me to understand the menu." in the revised questionnaire screen 420 corresponds to the useful response, and this choice does not exist in the previous questionnaire screen 400 (refer to FIG. 9).

At step SJ8, the questionnaire re-conducting section 107 decides whether the response to the questionnaire has ended by using the revised questionnaire screen 420, sets "No" as a result of the decision in this case, and then repeats making decision.

On the other hand, when the questionnaire respondent has responded to the question 2 by checking (selecting) a choice in the revised questionnaire screen 420 and has depressed the response end button not shown, the questionnaire re-conducting section 107 sets "Yes" as a result of the decision made at step SJ8 shown in FIG. 15.

At step SJ9, the questionnaire response collector 103 executes the processing for collecting a questionnaire response (refer to FIG. 9) in the same manner as that described above. At step SJ10, the useful response selector 104 executes the processing for selecting a useful response (refer to FIG. 10) in the same manner as that explained above.

A case where a new questionnaire is conducted after the questionnaire correction processing has been executed at step SA6 will be explained. In this case, the questionnaire information database 120 has the addition of "It is a little difficult for me to understand the menu." as the additional choice 1 as shown in FIG. 22.

When the respondent terminal 300₂ has accessed the questionnaire conducting apparatus 100 as a new questionnaire respondent via the network 200 and then has issued a request for conducting questionnaires, the questionnaire conducting section 102 sets "Yes" as a result of the decision made at step SA1.

At step SA4, the processing is executed so as to conduct the corrected questionnaire to the questionnaire respondent at the respondent terminal 300₂, in the similar manner as that described above. Specifically, at step SB1 shown in FIG. 7, the questionnaire conducting section 102 executes the processing for presenting the questionnaire to the questionnaire respondent.

In other words, in the questionnaire presentation processing shown in FIG. 8, at step SC1, the questionnaire conducting section 102 obtains questionnaire information from the questionnaire information database 120 shown in FIG. 22. At step SC2, the questionnaire conducting section 102 changes the obtained questionnaire information into a Web screen format.

At step SC3, the questionnaire conducting section 102 makes the questionnaire screen 430 shown in FIG. 25 corresponding to the formatted questionnaire information displayed to the respondent terminal 300₂. On the questionnaire screen 430, "It is a little difficult for me to understand the menu." (useful response) has been set as the additional choice 1 in the question 2.

Referring back to FIG. 7, at step SB2, the questionnaire conducting section 102 decides whether responses to the questionnaire have ended using the questionnaire screen 430. The questionnaire conducting section 102 sets "No" as a result of the decision, and repeats making decision.

On the other hand, the questionnaire respondent responds to the questionnaire by checking (selecting) a choice of each question on the questionnaire screen 430 shown in FIG. 25. At the same time, the questionnaire respondent enters the respondent mail address. A result of the response is as shown on the questionnaire response screen 440 in FIG. 26. At the question 2, the questionnaire respondent selects "It is a little difficult for me to understand the menu." (useful response) as the additional choice 1.

When the questionnaire respondent has depressed the response end button not shown, the questionnaire conducting section 102 sets "Yes" as a result of the decision made at step SB2 shown in FIG. 7. At step SB3, the questionnaire response collector 103 executes the processing for collecting a questionnaire response ("questionnaire response collection processing").

At step SD1 shown in FIG. 9, the questionnaire response collector 103 obtains questionnaire response information from the questionnaire response screen 440 shown in FIG. 26. Thereafter, the questionnaire response collector 103 executes the processing at step SD2 to step SD7 in the same manner as that explained above.

When the questionnaire response collection processing has ended, at step SB4 shown in FIG. 7, the useful response selector 104 executes the useful response selection processing in the same manner as that explained above. Specifically, at step SE1 shown in FIG. 10, the useful response selector 104 obtains questionnaire response information from the questionnaire response screen 440 shown in FIG. 26.

At step SE2, the useful response selector 104 decides whether the checking of responses in the questionnaire response information obtained at step SE1 has ended, and sets "No" as a result of the decision in this case.

At step SE3, the useful response selector 104 checks a check mark position as a response made to the next question (the question 1 shown in FIG. 26, in this example). The choice of "Yes" is checked in this example.

At step SE4, the useful response selector 104 decides whether the "type" of the choice at the check mark position is an additional choice by referring to the questionnaire information database 120 (refer to FIG. 22). As the type is the "initial choice 1", the useful response selector 104 sets "No" as a result of the decision.

At step SE2, the useful response selector 104 decides whether the checking of responses in the questionnaire response information obtained at step SE1 has ended. The useful response selector 104 sets "No" as a result of the decision.

At step SE3, the useful response selector 104 checks a check mark position as a response made to the next question (the question 2 shown in FIG. 26, in this example). The choice of "It is a little difficult for me to understand the menu." is checked in this example.

At step SE4, the useful response selector 104 decides whether the "type" of the choice at the check mark position is an additional choice by referring to the questionnaire information database 120 shown in FIG. 22. As the type is the "additional choice 1", the useful response selector 104 sets "Yes" as a result of the decision.

At step SE5, the useful response selector 104 increments by one the number of times of selecting the useful response ("It is a little difficult for me to understand the menu.") at the question 2 in the useful response information database 140 shown in FIG. 27. In other words, this case means that other questionnaire respondents have selected the useful response added to the questionnaire information in the questionnaire correction processing.

At step SE2, the useful response selector 104 sets "Yes" as a result of the decision. Then, the questionnaire conducting processing at step SA4 shown in FIG. 6 ends. At step SA5 shown in FIG. 6, the useful response selection processing is executed.

When the manager has issued an instruction of ending the questionnaire, the useful response point calculator 108 sets "Yes" as a result of the decision made at step SA3 shown in FIG. 6. At step SA8, the useful response point calculator 108 evaluates the usefulness of the useful response for each questionnaire respondent, and executes the processing for calculating a useful response point according to the usefulness, as an incentive to be given to the questionnaire respondent.

Figure 16:
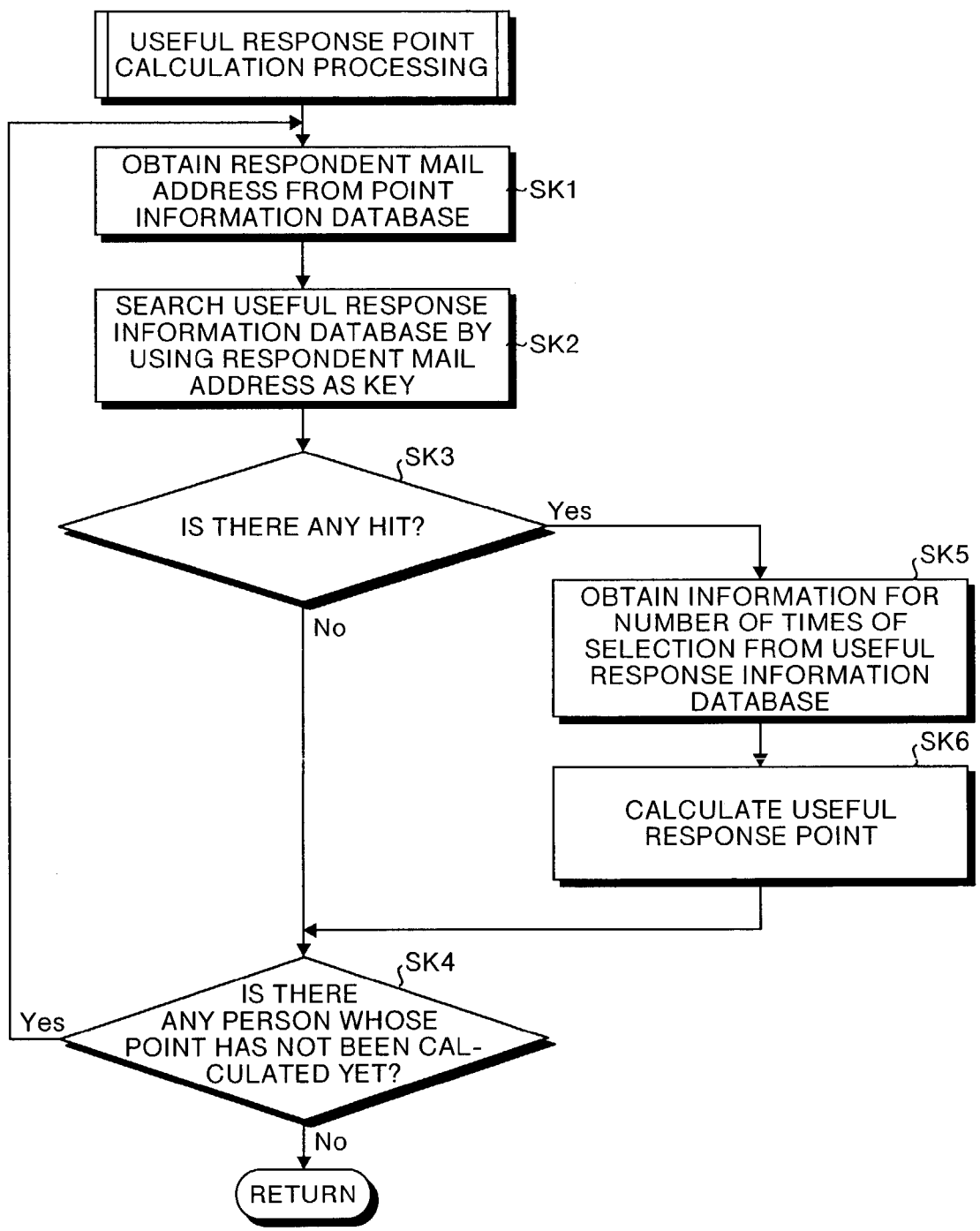
FIG. 16 is a flowchart for explaining the processing for calculating a useful response point shown in FIG. 6.

Specifically, at step SK1 shown in FIG. 16, the useful response point calculator 108 obtains one respondent mail address from the point information database 150 (refer to FIG. 5). At step SK2, the useful response point calculator 108 searches the useful response information database 140 shown in FIG. 27 by using the respondent mail address (for example, xxx@abc.com) obtained at step SK1 as a key.

At step SK3, the useful response point calculator 108 decides whether there is any hit when searching the database 140. In this example, there are some hits on the useful response information corresponding to the question 2 and on the useful response information corresponding to the question 4 shown in FIG. 27 when the searching is carried out by using the respondent mail address (xxx@abc.com) as the key. Therefore, the useful response point calculator 108 sets "Yes" as a result of the decision made at step SK3. When the result of the decision made at step SK3 is "No", the useful response point calculator 108 makes decision at step SK4.

At step SK5, the useful response point calculator 108 obtains the information of a number of times of selection (=27 times) from the useful response information corresponding to the question 2 and the information of a number of times of selection (=13 times) from the useful response information corresponding to the question 4 in the useful response information database 140 shown in FIG. 27 respectively. At step SK6, the useful response point calculator 108 calculates a useful response point of each piece of useful response information, based on the following equation (2). The fractional portion of the number is rounded up.

Useful response point=(useful response reference point)×((number of useful respondents+number of times of selection)/total number of responses) (2)

In the equation (2), the useful response reference point is uniformly given to questionnaire respondents who have given a response with free description information that has been recognized as a useful response in the useful response selection processing (step SA5: refer to FIG. 6). This point is, for example, 10.

The number of useful respondents is the number of questionnaire respondents who have made useful response, and is the number of respondent mail addresses corresponding to each piece of the useful response information shown in FIG. 27. The number of useful respondents corresponding to the question 2 is three. On the other hand, the number of useful respondents corresponding to the question 4 is five.

The total number of respondents is a total number of questionnaire respondents, and this is the number of the respondents mail addresses (for example, 100) shown in FIG. 5. The usefulness of a useful response, that is, the point about how often a particular useful response is selected by questionnaire respondents, is evaluated according to the equation (2).

In the example, the useful response point corresponding to the question 2 shown in FIG. 27 is calculated as 3(=10×(3+27)/100. On the other hand, the useful response point corresponding to the question 4 shown in FIG. 27 is calculated as 2(=10×(5+13)/100. Based on this, the useful response point calculator 108 stores the total value 5(=3+2) of the two useful response points into a memory not shown in correlation with a respondent mail address, as a useful response point to be given to the questionnaire respondent corresponding to the respondent mail address (xxx@abc.com).

When a plurality of useful response points exist like in the example, the total value becomes the useful response point. On the other hand, when only one useful response point is calculated, this useful response point is decided as the useful response point to be given.

Referring back to FIG. 16, at step SK4, the useful response point calculator 108 decides whether there is any respondent whose useful response point has not been calculated yet. The useful response point calculator 108 sets "Yes" as a result of the decision. At step SK1 and then on, the processing corresponding to the next respondent mail address (yyy@def.com) in the point information database 150 (refer to FIG. 5) is executed.

When a result of the decision made at step SK4 is "No", at step SA9 shown in FIG. 6, the original response point calculator 109 evaluates the originality of the opinion of a respondent described in the free-description box 401 (refer to FIG. 19), for each questionnaire respondent. The original response point calculator 109 executes the processing for calculating an original response point according to the originality as an incentive to be given to the questionnaire respondent.

Figure 17:
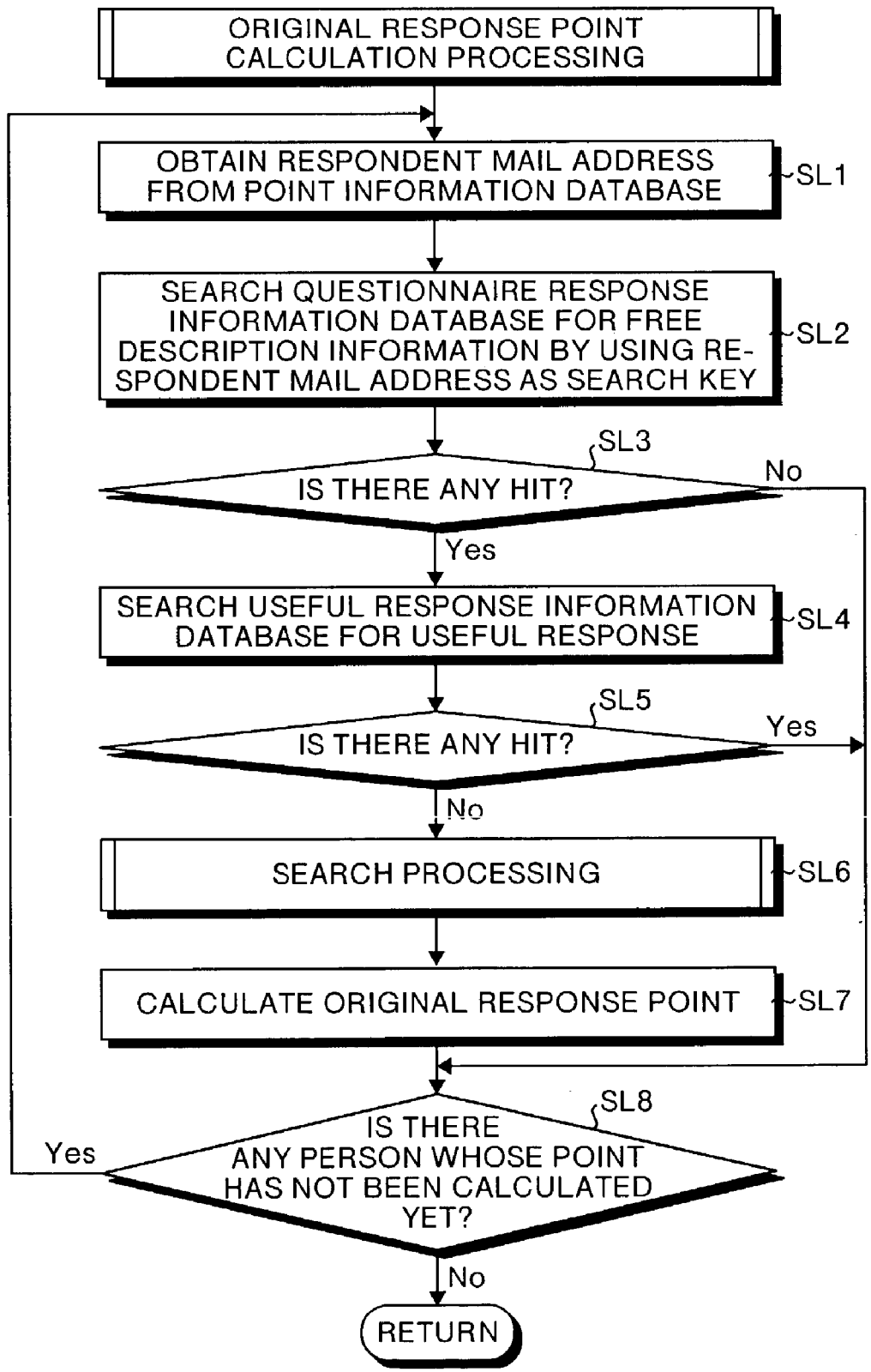
FIG. 17 is a flowchart for explaining the processing for calculating an original response point shown in FIG. 6.

Specifically, at step SL1 shown in FIG. 17, the original response point calculator 109 obtains one respondent mail address from the point information database 150 (refer to FIG. 5). At step SL2, the original response point calculator 109 searches the questionnaire response information database 130 shown in FIG. 3 for free description information by using the respondent mail address (for example, xxx@abc.com) obtained at step SL1.

At step SL3, the original response point calculator 109 decides whether there is any hit. When there is no hit, that is, when the questionnaire respondent has not described any information as an opinion in the free-description box, the original response point calculator 109 sets "No" as a result of the decision made at step SL3, and makes decision at step SL8.

In this example, there are some hits on the free description information (It is a little difficult for me to understand the menu.) corresponding to the question 2 shown in FIG. 3 by using the respondent mail address (xxx@abc.com) as the key. Therefore, the original response point calculator 109 sets "Yes" as a result of the decision made at step SL3.

At step SL4, the original response point calculator 109 searches the useful response information database 140 shown in FIG. 27 for a useful response, by using the questionnaire respondent mail address as a key. At step SL5, the original response point calculator 109 decides whether there is any hit, that is, whether the free description information (It is a little difficult for me to understand the menu.) is a useful response. When a result of the decision is "Yes", the original response point calculator 109 makes decision at SL8 without calculating the original response point.

On the other hand, when a result of the decision made at step SL5 is "No", the original response point calculator 109 executes the search processing used for the evaluation of the originality of the free description information that has been searched for at step SL2.

Specifically, at step SG1 shown in FIG. 12, the original response point calculator 109 obtains the free description information ("It is a little difficult for me to understand the menu." in this example) that has been searched for at step SL2 and the question ID (the question 2, in this example) corresponding to this information, and uses these information as search keys.

At step SG2, the original response point calculator 109 divides the free description information "It is a little difficult for me to understand the menu." as the search key into sets of adjacent two words as shown in FIG. 21.

At step SG3, the original response point calculator 109 obtains free description information described by other questionnaire respondents from the questionnaire response information database 130 (excluding the questionnaire response information of this respondent) shown in FIG. 3, by using the question ID (=the question 2) obtained at step SG1 as a search key.

In this example, it is assumed that "It is a bit hard to understand the menu." shown in FIG. 21 as the free description information is obtained from the questionnaire response information database 130.

At step SG4, the original response point calculator 109 divides the free description information "It is a bit hard to understand the menu." as a result of the search, into sets of adjacent two words as shown in FIG. 21. At step SG5, the original response point calculator 109 compares the result of the division at step SG2 with the result of the division at step SG4, and counts the number of sets of two words that coincide with each other, as shown in FIG. 21. The number of sets that coincide is five, in this example.

At step SG6, the original response point calculator 109 calculates a level of similarity between the free description information (the search key) searched for at step SL2 and the free description information as the search result obtained from the questionnaire response information database 130, from the equation (1).

At step SG7, the original response point calculator 109 decides whether the similarity level calculated at step SG6 is equal to or above a first threshold value. The original response point calculator 109 sets "Yes" as a result of the decision made at step SG7. At step SG8, the original response point calculator 109 increments the number of similar cases by one. When the result of the decision made at step SG7 is "No", the original response point calculator 109 makes decision at step SG9.

At step SG9, the original response point calculator 109 decides whether the searching at step SG3 has ended. The original response point calculator 109 sets "No" as a result of the decision in this example. At step SG3 and then on, the similarity level is calculated and the number of similar cases is counted.

When the result of the decision made at step SG9 is "Yes", the original response point calculator 109 skips the processing at step SG10 and step SG11. At step SL7 shown in FIG. 17, the original response point calculator 109 calculates an original response point based on the following equation (3), and stores the calculated point in correlation with the questionnaire mail address, into a memory not shown. The fractional portion of the number is rounded up.

$$\text{Original response point}=(\text{original response reference point})\times(1/\text{number of similar cases}) \quad (3)$$

In the equation (3), the original response reference point is uniformly given to questionnaire respondents who have given a response with free description information other than a useful response. This point is 10, for example. The number of similar cases is counted in the search processing (step SG8: refer to FIG. 12).

As explained above, according to the equation (3), the originality of the free description information is evaluated. When the number of similar cases is smaller, the originality becomes higher. For example, if the original response reference point is 10 and the number of similar cases is 5, then the original response point is calculated as $2(=10\times(1/5))$.

At step SL8, the original response point calculator 109 decides whether there is any respondent whose original response point has not been calculated yet, and sets "Yes" as a result of the decision in this example. At step SL1 and then on, the processing corresponding to the next respondent mail address (yyy@def.com) in the point information database 150 (refer to FIG. 5) is executed.

When the result of the decision made at step SL8 is "No", at step SA10 shown in FIG. 6, the point notifying section 110 executes the processing for notifying the questionnaire respondent of a total point based on the useful response point and the original response point.

Figure 18:
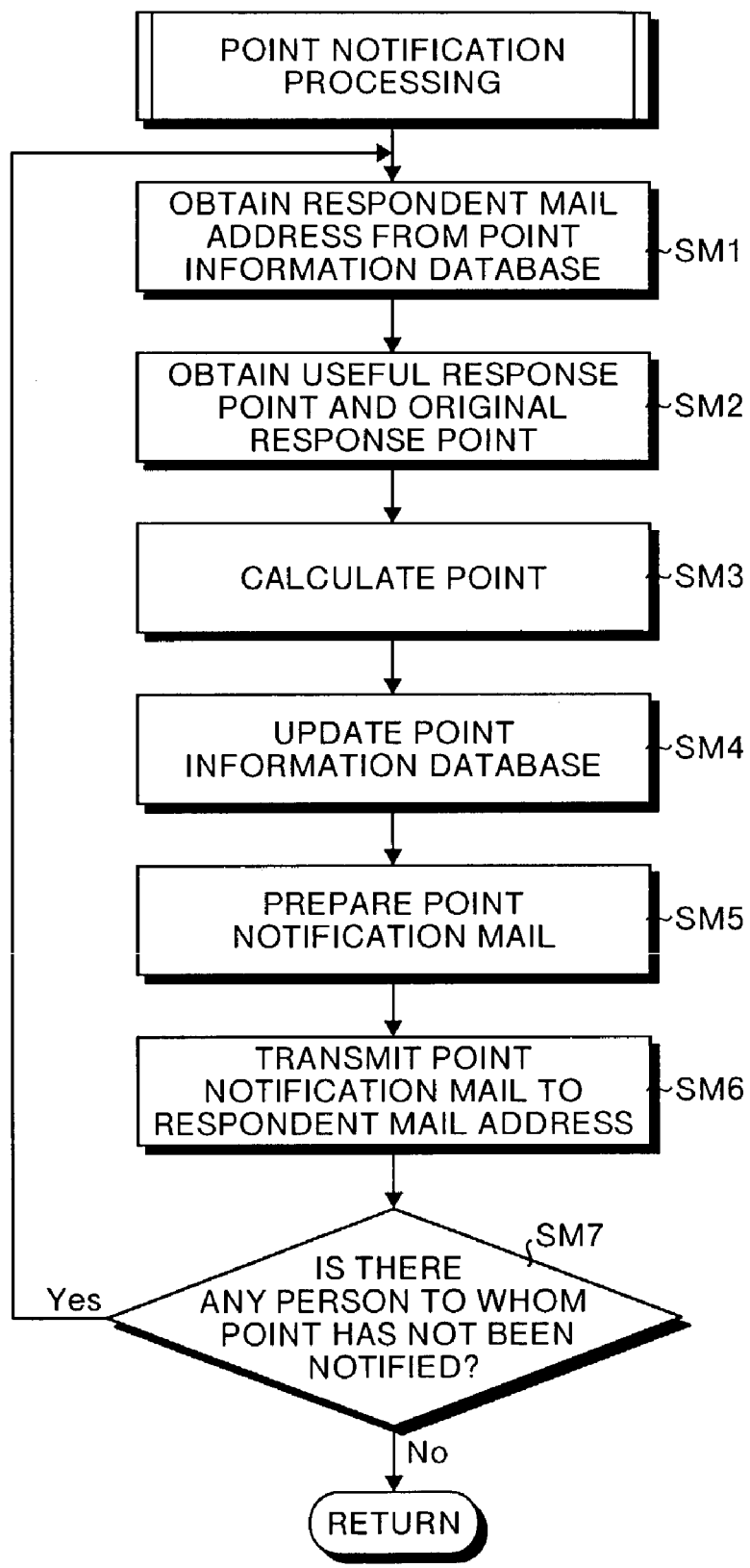
FIG. 18 is a flowchart for explaining the processing for point notification shown in FIG. 6.

Specifically, at step SM1 shown in FIG. 18, the point notifying section 110 obtains one respondent mail address (for example, xxx@abc.com) from the point information database 150 (refer to FIG. 5). At step SM2, the point notifying section 110 obtains the useful response point and the original response point from a memory not shown, by using the respondent mail address as a search key.

At step SM3, the point notifying section 110 calculates a total point based on the following equation (4). The fractional portion of the number is rounded up.

$$\text{Point}=\text{basic point}+(\text{useful response weight}\times\text{useful response point})+(\text{original response weight}\times\text{original response point}) \quad (4)$$

In the equation (4), the basic point is uniformly given to questionnaire respondents. The useful response weight is a value of 0 or above that expresses the weight of a useful response point. The questionnaire implementer optionally sets this weight. The useful response point is obtained at step SM2.

The original response weight is a value of 0 or above that expresses a weight of an original response. The questionnaire implementer optionally sets this weight. The original response point is obtained at step SM2. When the policy is to give a larger weight to the useful response point than to the original response point, a larger value is set to the useful response weight than to the original response weight.

At step SM4, the point notifying section 110 adds a total point (18, for example) that has been calculated from the equation (4) to the point (=100) in the point information database 150 (refer to FIG. 5), by using the questionnaire mail address as a search key. Then, the point notifying section 110 updates the point to 118 in the point information database 150.

Figures 28, 29:
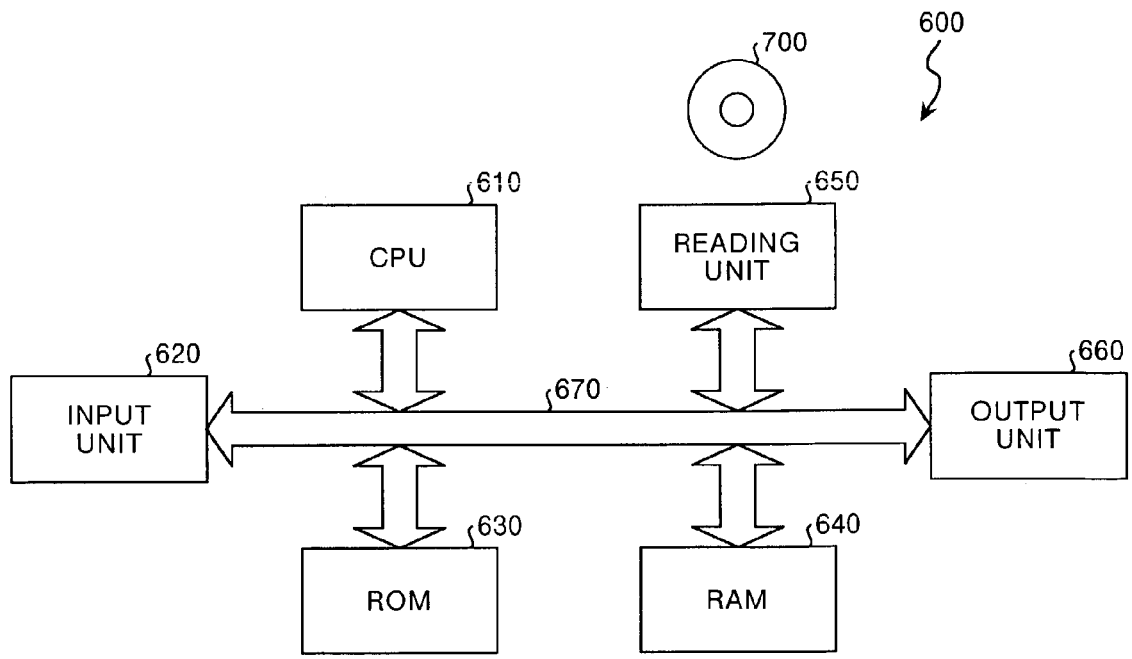
FIG. 28 is a diagram showing a point notification mail 510 in the processing for the point notification shown in FIG. 18.
FIG. 29 is a block diagram showing a configuration of a modification of the same embodiment.

At step SM5, the point notifying section 110 prepares a point notification mail 510 shown in FIG. 28. The point notification mail 510 includes information for thanks to the questionnaire respondent for the questionnaire response, the point (18, for example) obtained at the questionnaire response this time, and for the point (=118) after the addition.

At step SM6, the point notifying section 110 transmits the point notification mail 510 (refer to FIG. 28) to the questionnaire mail address (the respondent terminal $300_1$, for example) obtained at step SM1. When the respondent terminal $300_1$ has received this point notification mail 510, the respondent terminal $300_1$ confirms the increased point, and exchanges the point with a gift if required.

At step SM7, the point notifying section 110 decides whether there is any respondent to whom the point has not been notified. The point notifying section 110 sets "Yes" as a result of the decision, and executes the processing at step SM1 and then on. When the notification of points to all the questionnaire respondents has ended, the point notifying section 110 sets "No" as a result of the decision made at step SM7. Then, a series of processing for the questionnaire is ended.

In the present embodiment, a useful response point calculated by the useful response point calculator 108 (or an original response point calculated by the original response point calculator 109) may be notified to the respondent terminal to give this respondent terminal the useful response point (or the original response point).

As explained above, according to the present embodiment, the questionnaire response collector 103 collects responses to the questionnaire that has been presented to the questionnaire respondents. Based on a result of the collection, the questionnaire corrector 106 corrects the questionnaire. Therefore, it is possible to improve the quality of the questionnaire based on the feedback of the responses.

According to the present embodiment, when an opinion of a respondent described in the free-description box satisfies a predetermined condition, the useful response sorter 105 sorts this opinion as a useful response, and reflects this useful response in the questionnaire. Therefore, it is possible to raise questions of high usefulness to other respondents, and thus, it becomes possible to further improve the quality of the questionnaire.

According to the present embodiment, when the questionnaire has been corrected, the questionnaire re-conducting section 107 re-presents the corrected questionnaire to the respondents who have responded before the questionnaire is corrected. The questionnaire re-conducting section 107 collects responses to the corrected questionnaire. Therefore, the number of responses to the questionnaire increases. As a result, it is possible to improve the reliability of the total questionnaire results.

According to the present embodiment, the useful response point calculator 108 evaluates the usefulness of a useful response, and calculates a useful response point according to the usefulness as an incentive to be given to the respondent. Therefore, it is possible to increase the response rate of responses to the questionnaire having high usefulness.

According to the present embodiment, the original response point calculator 109 evaluates the originality of an opinion of a respondent, and calculates an original response point according to the originality as an incentive to be given to the respondent. Therefore, it is possible to increase the response rate of responses to the questionnaire having high originality.

While the embodiment according to the present invention has been explained with reference to the drawings, the detailed structure example is not limited to that shown in this embodiment. Any design alteration within a scope not deviating from the gist of the present invention is included in the present invention.

For example, in the present embodiment, a program that realizes the functions of the questionnaire conducting apparatus 100 may be recorded on a computer-readable recording medium 700 shown in FIG. 29. The program recorded on the recording medium 700 may be loaded into a computer 600 shown in FIG. 29 and the functions may be realized on the computer 600.

The computer 600 includes a CPU (Central Processing Unit) 610 that executes the program, an input unit 620 such as a keyboard and a mouse, a ROM (Read Only Memory) 630 that stores various kinds of data, a RAM (Random Access Memory) 640 that stores operation parameters, a reading unit 650 that reads the program from the recording medium 700, an output unit 660 such as a display and a printer, and a bus 670 that connects between the units.

The CPU 610 reads the program recorded on the recording medium 700 via the reading unit 650, and executes this program to perform the functions. An optical disk, a flexible disk, and a hard disk may be used for the recording medium 700.

As explained above, according to one aspect of the present invention, responses to the questionnaire presented to the questionnaire respondents are collected, and the questionnaire is corrected based on a result of the collection. Therefore, it is advantageously possible to improve the quality of the questionnaire based on the feedback of the responses.

According to another aspect of the present invention, when an opinion of a questionnaire respondent included in the collection result satisfies a predetermined condition, this opinion is sorted as a useful response, and this useful response is reflected in the questionnaire. Therefore, it is possible to raise questions of high usefulness to other respondents, and thus, it is advantageously possible to further improve the quality of the questionnaire.

According to still another aspect of the present invention, the useful response is reflected as a choice for response to the questionnaire. Therefore, other questionnaire respondents may select the choice based on the opinion of high usefulness, and thus, it is advantageously possible to further improve the quality of the questionnaire.

According to still another aspect of the present invention, the opinion of a questionnaire respondent is sorted as a useful response based on the level of similarity between this opinion of the questionnaire respondent and opinions of other questionnaire respondents. Therefore, it is possible to raise questions of high usefulness to other respondents, and thus, it is advantageously possible to further improve the quality of the questionnaire.

According to still another aspect of the present invention, when there are at least a predetermined number of cases in which the similarity level is at or above a threshold value, the opinion of the questionnaire respondent is sorted as a useful response. Therefore, it is possible to raise questions of high usefulness to other respondents, and thus, it is advantageously possible to further improve the quality of the questionnaire.

According to still another aspect of the present invention, when the questionnaire has been corrected, the corrected questionnaire is presented again to the respondents who have responded before the questionnaire is corrected, and the responses to the corrected questionnaire are collected. Therefore, the number of responses to the questionnaire increases, and thus, it is advantageously possible to improve the total reliability of the questionnaire results.

According to still another aspect of the present invention, the usefulness of a useful response is evaluated, and a point of the useful response is calculated according to the usefulness, as an incentive to be given to the respondent. Therefore, it is advantageously possible to increase the response rate of responses to the questionnaire having high usefulness.

According to still another aspect of the present invention, the originality of an opinion of a respondent is evaluated, and an original response point is calculated according to the originality as an incentive to be given to the respondent. Therefore, it is advantageously possible to increase the response rate of responses to the questionnaire having high originality.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A program implemented on a computer that when executed conducts a questionnaire that makes a computer function as:

a communicating unit that communicates with a respondent terminal having a display screen through a network;

a questionnaire information database that stores a plurality of questionnaire information;

a questionnaire conducting unit that transmits a questionnaire based on the questionnaire information stored in the questionnaire database to the respondent terminal through the network for making the respondent terminal display the questionnaire and a response screen for allowing responses to be inputted on the display screen, and the response screen a free-description text box for inputting arbitrary information;

a questionnaire response collecting unit that collects responses to the questionnaire inputted at the respondent terminal, the questionnaire response collecting unit analyzing the responses to create questionnaire response information;

a questionnaire response database that stores the questionnaire response information;

a useful response selecting unit for selecting a useful response among a plurality of arbitrary information inputted in the free-description text box based on similarity and quantity among the plurality of arbitrary information;

a useful response information database for storing the useful response selected by the useful response selecting unit;

a correcting unit that corrects the questionnaire based on the useful response stored in the useful response information database for creating the questionnaire including additional choice based on the useful response; and a questionnaire re-conducting unit that transmits the questionnaire including the additional choice to the respondent terminal through the network for making the respondent terminal display the questionnaire including the additional choice and the response screen for allowing responses to be inputted on the display screen.

2. The program according to claim 1 that further makes a computer function as:

a useful response sorting unit that sorts an opinion as a useful response when the opinion of the questionnaire respondent included in the collection result satisfies a predetermined condition, wherein the correcting unit reflects the useful response in the questionnaire.

3. The program according to claim 2, wherein the correcting unit reflects the useful response as a choice for response to the questionnaire.

4. The program according to claim 2, wherein the useful response sorting unit sorts the opinion of the questionnaire respondent as a useful response based on a level of similarity between the opinion of the questionnaire respondent and opinions of other questionnaire respondents.

5. The program according to claim 4, wherein the useful response sorting unit sorts the opinion of the questionnaire respondent as a useful response when there are at least a predetermined number of cases in which the similarity level is at or above a threshold value.

6. The program according to claim 2, wherein any opinion of the questionnaire respondent is described in a free-description box corresponding to a question of the questionnaire.

7. The program according to claim 2 that further makes a computer function as:

a useful response point calculating unit that evaluates usefulness of the useful response, and calculates a point for the useful response according to the usefulness, as an incentive to be given to the questionnaire respondent.

8. The program according to claim 7, wherein the useful response point calculating unit evaluates the usefulness according to how many times other questionnaire respondents select the useful response.

9. The program according to claim 2 that further makes a computer function as:

an original response point calculating unit that evaluates originality of the opinion of the questionnaire respondent included in the collection result, and calculates a point for the original response according to the originality, as an incentive to be given to the questionnaire respondent.

10. The program according to claim 9, wherein the original response point calculating unit evaluates originality based on a level of similarity between the opinion of the questionnaire respondent and opinions of other questionnaire respondents.

11. The program according to claim 2 that further makes a computer function as:

a useful response point calculating unit that evaluates usefulness of the useful response, and calculates a point for the useful response according to the usefulness, as an incentive to be given to the questionnaire respondent;

an original response point calculating unit that evaluates originality of the opinion of the questionnaire respondent included in the collection result, and calculates a point for the original response according to the originality, as an incentive to be given to the questionnaire respondent; and a total point calculating unit that calculates a total point based on the useful response point and the original response point.

12. The program according to claim 1, wherein when the correcting unit has corrected the questionnaire, the presenting unit re-presents the corrected questionnaire to questionnaire respondents who have responded before the questionnaire is corrected, and the collecting unit collects responses to the corrected questionnaire.

13. An apparatus for conducting a questionnaire comprising:

a communicating unit that communicates with a respondent terminal having a display screen through a network;

a questionnaire information database that stores a plurality of questionnaire information;

a questionnaire conducting unit that transmits a questionnaire based on the questionnaire information stored in the questionnaire database to the respondent terminal through the network for making the respondent terminal display the questionnaire and a response screen for allowing responses to be inputted on the display screen, and the response screen including a free-description text box for inputting arbitrary information;

a questionnaire response collecting unit that collects responses to the questionnaire inputted at the respondent terminal, the questionnaire response collecting unit analyzing the response to create questionnaire response information;

a questionnaire response database that stores the questionnaire response information;

a useful response selecting unit for selecting a useful response among a plurality of arbitrary information inputted in the free-description text box based on similarity and quantity among the plurality of arbitrary information;

a useful response information database for storing the useful response selected by the useful response selecting unit;

a correcting unit that corrects the questionnaire based on the useful response stored in the useful response information database for creating the questionnaire including additional choice based on the useful response; and a questionnaire re-conducting unit that transmits the questionnaire including the additional choice to the respondent terminal through the network for making the respondent terminal display the questionnaire including the additional choice and the response screen for allowing responses to be inputted on the display screen.

14. The apparatus according to claim 13, further comprising:
a useful response sorting unit that sorts an opinion as a useful response when the opinion of the questionnaire respondent included in the collection result satisfies a predetermined condition, wherein the correcting unit reflects the useful response in the questionnaire.

15. The apparatus according to claim 14, wherein the correcting unit reflects the useful response as a choice for response to the questionnaire.

16. The apparatus according to claim 15, wherein the useful response sorting unit sorts the opinion of the questionnaire respondent as a useful response based on a level of similarity between the opinion of the questionnaire respondent and opinions of other questionnaire respondents.

17. The apparatus according to claim 14, wherein the useful response sorting unit sorts the opinion of the questionnaire respondent as a useful response based on a level of similarity between the opinion of the questionnaire respondent and opinions of other questionnaire respondents.

18. The apparatus according to claim 17, wherein the useful response sorting unit sorts the opinion of the questionnaire respondent as a useful response when there are at least a predetermined number of cases in which the similarity level is at or above a threshold value.

19. The apparatus according to claim 14, wherein any opinion of the questionnaire respondent is described in a free-description box corresponding to a question of the questionnaire.

20. The apparatus according to claim 14, further comprising:
a useful response point calculating unit that evaluates usefulness of the useful response, and calculates a point for the useful response according to the usefulness, as an incentive to be given to the questionnaire respondent.

21. The apparatus according to claim 20, wherein the useful response point calculating unit evaluates the usefulness according to how many times other questionnaire respondents select the useful response.

22. The apparatus according to claim 14, further comprising:
an original response point calculating unit that evaluates originality of the opinion of the questionnaire respondent included in the collection result, and calculates a point for the original response according to the originality, as an incentive to be given to the questionnaire respondent.

23. The apparatus according to claim 22, wherein the original response point calculating unit evaluates the originality based on a level of similarity between the opinion of the questionnaire respondent and opinions of other questionnaire respondents.

24. The apparatus according to claim 14, further comprising:
a useful response point calculating unit that evaluates usefulness of the useful response, and calculates a point for the useful response according to the usefulness, as an incentive to be given to the questionnaire respondent;
an original response point calculating unit that evaluates originality of the opinion of the questionnaire respondent included in the collection result, and calculates a point for the original response according to the originality, as an incentive to be given to the questionnaire respondent; and
a total point calculating unit that calculates a total point based on the useful response point and the original response point.

25. The apparatus according to claim 13, wherein when the correcting unit has corrected the questionnaire, the presenting unit re-presents the corrected questionnaire to questionnaire respondents who have responded before the questionnaire is corrected, and the collecting unit collects responses to the corrected questionnaire.

26. A method of conducting a questionnaire comprising:
communicating with a respondent terminal having a display screen through a network;
storing a plurality of questionnaire information in a questionnaire information database;
transmitting a questionnaire based on the questionnaire information stored in the questionnaire database to the respondent terminal through the network for making the respondent terminal display the questionnaire and a response screen for allowing responses to be inputted on the display screen and the response screen including a free-description text box for inputting arbitrary information;
collecting the responses to the questionnaire inputted at the respondent terminal;
analyzing the responses to create questionnaire response information;
storing the questionnaire response information in a questionnaire response database;
selecting a useful response among a plurality of arbitrary information inputted in the free-description text box based on a similarity and quantity among the plurality of arbitrary information;
storing the useful response selected by the useful response selecting unit in a useful response information database;
correcting the questionnaire based on the useful response stored in the useful response information database for creating the questionnaire including additional choice based on the useful response; and
transmitting the questionnaire including the additional choice again to the respondent terminal through the network for making the respondent terminal display the questionnaire including the additional choice and the response screen for allowing responses to the inputted, on the display screen.

27. The method according to claim 26, further comprising a step of sorting an opinion as a useful response when the opinion of the questionnaire respondent included in the collection result satisfies a predetermined condition, wherein the correcting step includes reflecting the useful response in the questionnaire.

28. The method according to claim 27, wherein the correcting step includes reflecting the useful response as a choice for response to the questionnaire.

29. The method according to claim 27, wherein the useful response sorting step includes sorting the opinion of the questionnaire respondent as a useful response based on a level of similarity between the opinion of the questionnaire respondent and opinions of other questionnaire respondents.

30. The method according to claim 29, wherein the useful response sorting step includes sorting the opinion of the questionnaire respondent as a useful response when there are at least a predetermined number of cases in which the similarity level is at or above a threshold value.

31. The method according to claim 27, wherein any opinion of the questionnaire respondent is described in a free-description box corresponding to a question of the questionnaire.

32. The method according to claim 27, further comprising a step of:
   evaluating usefulness of the useful response end calculating a point for the useful response according to the usefulness, as an incentive to be given to the questionnaire respondent.

33. The method according to claim 32, wherein the useful response point calculating step includes evaluating the usefulness according to how many times other questionnaire respondents select the useful response.

34. The method according to claim 27, further comprising a step of:
   evaluating originality of the opinion of the questionnaire respondent included in the collection result and calculating a point for the original response according to the originality, as an incentive to be given to the questionnaire respondent.

35. The method of conducting a questionnaire according to claim 34, wherein the original response point calculating step includes evaluating the originality based on a level of similarity between the opinion of the questionnaire respondent and opinions of other questionnaire respondents.

36. The method according to claim 27, further comprising steps of:
   evaluating usefulness of the useful response and calculating a point for the useful response according to the usefulness, as an incentive to be given to the questionnaire respondent;
   evaluating originality of the opinion of the questionnaire respondent included in the collection result and calculating a point for the original response according to the originality, as an incentive to be given to the questionnaire respondent; and
   calculating a total point based on the useful response point and the original response point.

37. The method according to claim 26, wherein when the questionnaire has been corrected at the correcting step, the presenting step includes representing the corrected questionnaire to questionnaire respondents who have responded before the questionnaire is corrected, and the collecting step includes collecting responses to the corrected questionnaire.

* * * * *

UNITED STATES PATENT AND TRADEMARK OFFICE
CERTIFICATE OF CORRECTION

PATENT NO. : 7,054,876 B2  
APPLICATION NO. : 10/326298  
DATED : May 30, 2006  
INVENTOR(S) : Takashi Yanase et al.

It is certified that error appears in the above-identified patent and that said Letters Patent is hereby corrected as shown below:

Column 25, line 7, change "end" to --and--

Signed and Sealed this

Twelfth Day of September, 2006

JON W. DUDAS  
*Director of the United States Patent and Trademark Office*